(12) United States Patent
Enomoto et al.

(10) Patent No.: US 9,594,290 B2
(45) Date of Patent: Mar. 14, 2017

(54) MONITORING APPARATUS FOR CONTROLLING OPERATION OF SHUTTER

(71) Applicant: PANASONIC INTELLECTUAL PROPERTY MANAGEMENT CO., LTD., Osaka (JP)

(72) Inventors: Hirofumi Enomoto, Fukuoka (JP); Jyouji Wada, Fukuoka (JP); Yasuhiro Fujiwara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 350 days.

(21) Appl. No.: 14/160,819

(22) Filed: Jan. 22, 2014

(65) Prior Publication Data

US 2015/0207971 A1   Jul. 23, 2015

(51) Int. Cl.
*H04N 5/232* (2006.01)
*G03B 7/00* (2014.01)
*H04N 5/225* (2006.01)
*H04N 5/247* (2006.01)
*G08B 13/196* (2006.01)
*G08B 25/12* (2006.01)
*G03B 11/04* (2006.01)
(Continued)

(52) U.S. Cl.
CPC ............... *G03B 7/00* (2013.01); *G03B 11/04* (2013.01); *G08B 13/1963* (2013.01); *G08B 25/12* (2013.01); *H04N 5/2252* (2013.01); *H04N 5/23206* (2013.01); *H04N 5/247* (2013.01); *G08B 13/19645* (2013.01); *G08B 13/19695* (2013.01); *G08B 19/00* (2013.01); *H04N 5/23219* (2013.01); *H04N 7/183* (2013.01)

(58) Field of Classification Search
CPC ............. H04N 21/2187; H04N 21/454; G06K 9/00771; G06K 9/00671; G06K 2009/00738; G06K 9/00711; G06T 2207/30232; G06T 2207/30196
See application file for complete search history.

(56) References Cited

U.S. PATENT DOCUMENTS 8,123,419 B2   2/2012   Cirker
2001/0015692 A1 *  8/2001   Takanori ............ G07C 9/00309
                                                   340/5.23
(Continued)

OTHER PUBLICATIONS

U.S. Appl. No. 14/086,193 to Hirofumi Enomoto, filed Nov. 21, 2013.
(Continued)

*Primary Examiner* — Hung Dang
*Assistant Examiner* — Sunghyoun Park
(74) *Attorney, Agent, or Firm* — Greenblum & Bernstein, P.L.C.

(57) ABSTRACT

A monitoring apparatus is connected to a shutter which opens and closes to limit a capturing area of an image capturing device. The monitoring apparatus includes an information obtaining section, configured to obtain information, an existence determiner, configured to determine whether a person exists or not in a predetermined area in accordance with the information obtained by the information obtaining section, and a shutter control unit, configured to control the shutter to be opened in response that the existence determiner determines that the person does not exist in the predetermined area.

12 Claims, 18 Drawing Sheets

(51) Int. Cl.
  *H04N 7/18* (2006.01)
  *G08B 19/00* (2006.01)

(56) References Cited

U.S. PATENT DOCUMENTS

| | | | | |
|---|---|---|---|---|
| 2003/0086591 | A1* | 5/2003 | Simon | G06K 19/07 |
| | | | | 382/115 |
| 2005/0099273 | A1* | 5/2005 | Shimomura | B60R 25/1004 |
| | | | | 340/426.1 |
| 2005/0122397 | A1* | 6/2005 | Henson | G06K 9/00771 |
| | | | | 348/143 |
| 2006/0271695 | A1* | 11/2006 | Lavian | G06F 21/552 |
| | | | | 709/229 |
| 2007/0063840 | A1* | 3/2007 | Jentoft | G08B 13/19641 |
| | | | | 340/541 |
| 2007/0064109 | A1* | 3/2007 | Renkis | G08B 13/19615 |
| | | | | 348/159 |
| 2007/0289012 | A1* | 12/2007 | Baird | H04L 9/321 |
| | | | | 726/17 |
| 2008/0224862 | A1 | 9/2008 | Cirker | |
| 2009/0080878 | A1* | 3/2009 | Cirker | G08B 13/19634 |
| | | | | 396/433 |
| 2009/0160673 | A1 | 6/2009 | Cirker | |
| 2010/0019927 | A1 | 1/2010 | Cirker | |
| 2010/0097225 | A1* | 4/2010 | Petricoin, Jr. | G07C 9/00111 |
| | | | | 340/573.1 |
| 2011/0103786 | A1 | 5/2011 | Cirker | |
| 2012/0013744 | A1* | 1/2012 | Piel | G08B 25/008 |
| | | | | 348/153 |
| 2012/0113263 | A1 | 5/2012 | Cirker | |
| 2012/0314063 | A1 | 12/2012 | Cirker | |
| 2013/0305337 | A1* | 11/2013 | Newman | H04L 12/1818 |
| | | | | 726/7 |

OTHER PUBLICATIONS

U.S. Appl. No. 14/039,198 to Takae Oguchi et al., filed Sep. 27, 2013.

* cited by examiner

FIG. 6

| | CAMERA 200A (IP ADDRESS: IpA) | CAMERA 200B (IP ADDRESS: IpB) | CAMERA 200C (IP ADDRESS: IpC) | CAMERA 200D (IP ADDRESS: IpD) | CAMERA 200E (IP ADDRESS: IpE) |
|---|---|---|---|---|---|
| SENSOR 510A1 | PRESET AP1 | PRESET BP2 | PRESET CP2 | PRESET DP1 | PRESET EP4 |
| SENSOR 510A2 | PRESET AP3 | PRESET BP3 | PRESET CP1 | | PRESET EP2 |
| SENSOR 510C1 | PRESET AP3 | PRESET BP3 | PRESET CP1 | | PRESET EP2 |
| SENSOR 510C2 | PRESET AP2 | PRESET BP4 | PRESET CP4 | PRESET DP3 | PRESET EP3 |
| SENSOR 510E1 | | PRESET BP1 | PRESET CP3 | PRESET DP2 | PRESET EP1 |
| SENSOR 510E2 | PRESET AP2 | PRESET BP4 | PRESET CP4 | PRESET DP3 | PRESET EP3 |

| | | SHUTTER CONTROL | EXISTENCE OF PERSON (ESTIMATED) | BASIC STATE OF SHUTTER | EXISTENCE OF PERSON (ACTUAL) |
|---|---|---|---|---|---|
| WEEKDAY | 0:00-8:30 | OPEN | NOT EXIST | CLOSE | EXIST |
| | 8:30-17:00 | CLOSE | EXIST | CLOSE | EXIST |
| | 17:00-24:00 | OPEN | NOT EXIST | CLOSE | EXIST |
| HOLIDAY | 0:00-24:00 | OPEN | NOT EXIST | CLOSE | EXIST |

T14

MONITORING APPARATUS FOR CONTROLLING OPERATION OF SHUTTER

BACKGROUND

1. Technical Field

The present invention relates to a monitoring apparatus for controlling an operation of a shutter.

2. Background Art

In a related art, a camera system that includes a camera device and a shutter which covers the camera device, and exposes or obstructs the camera lens depending on the opening and closing of the shutter, is known. In the camera system, in a case where the shutter is in a closed state, the camera lens is obstructed and privacy of a person who is present in the image capturing area of the camera device can be protected. In a case where the shutter is in an open state, the camera lens is exposed and an image of a subject that is present in the image capturing area of the camera device is captured, and then security can be protected.

SUMMARY

In the camera system of the related art, it is insufficient to protect the privacy or to secure the security.

An aspect of the present invention provides a monitoring apparatus for determining whether a person exists or not in a predetermined area and controlling an operation of a shutter which limits a capturing device of an image capturing device.

According to the aspect of the present invention, it is possible to improve the level of protecting the privacy or ensuring the security.

BRIEF DESCRIPTION OF THE DRAWINGS

In the accompanying drawings:

FIG. 6 is a schematic diagram illustrating an example of an information table which shows the relationship between each sensor and a preset position of each camera device in the embodiment;

FIG. 18 is a schematic diagram illustrating an example of a time table including information of open and closed state of the shutter in each time zone and information of existence of a person according to the embodiment.

DETAILED DESCRIPTION

Hereinafter, an embodiment of the present invention will be described with reference to the drawings.

Figure 1:
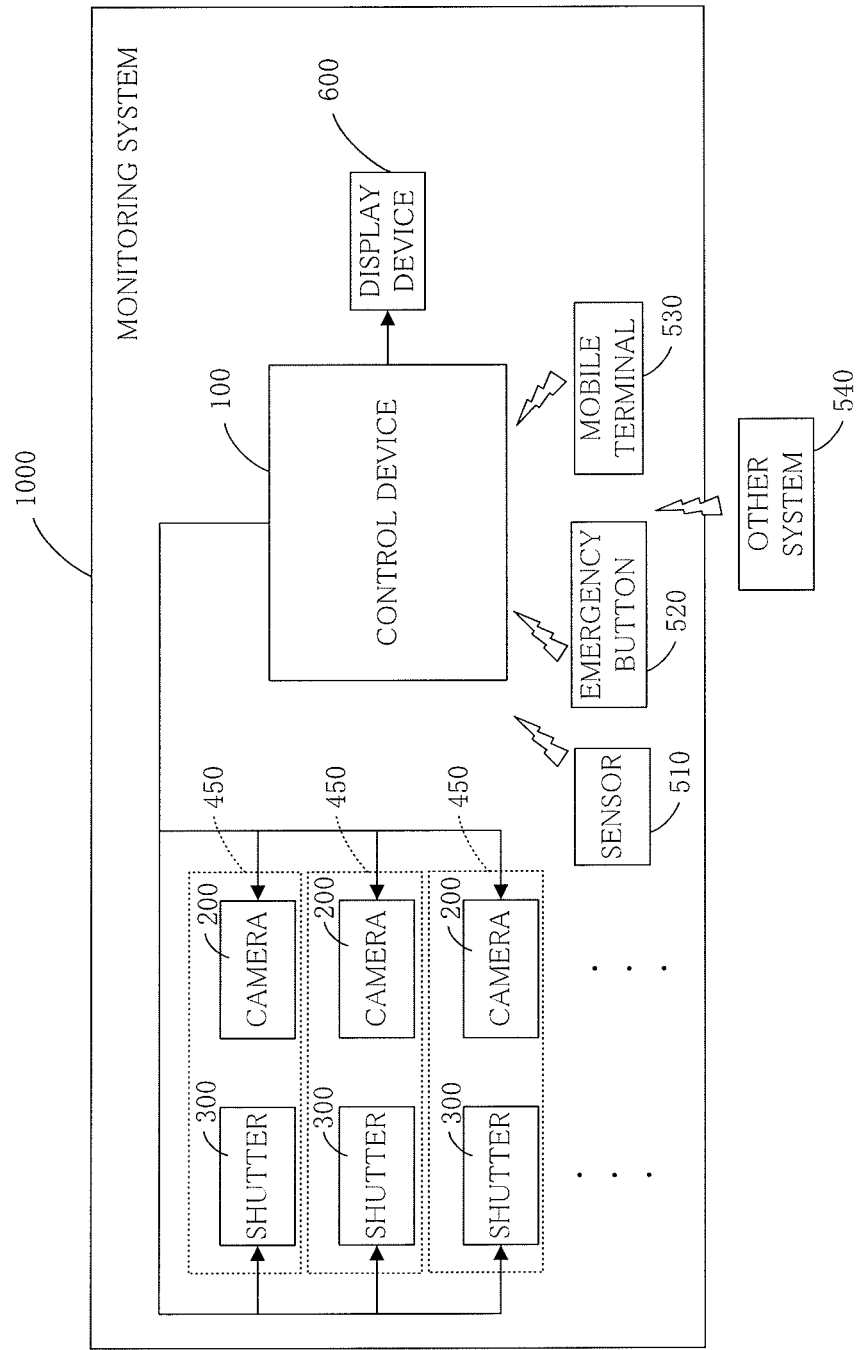
FIG. 1 is a block diagram illustrating a configuration example of a monitoring system in an embodiment.

FIG. 1 is a block diagram illustrating a configuration example of a monitoring system 1000 in the embodiment. The monitoring system 1000 includes a control device 100, a camera device 200, a shutter 300, a sensor 510, an emergency button 520, a mobile terminal 530, and a display device 600. The sensor 510, the emergency button 520, or the mobile terminal 530 can be omitted.

The control device 100 is, for example, disposed in the monitoring center and operates as a monitoring server. Alternatively, the control device 100 may be, for example, disposed for each camera device 200 or for each predetermined area where one or more camera devices 200 are arranged, and may be in cooperation with the central server of the monitoring center.

The camera device 200 is installed on the wall or ceiling of, for example, various facilities, a predetermined room in the facilities, or a predetermined area of the room in the facilities. The camera device 200 is, for example, capable of rotating in a panning direction and in a tilting direction, and captures an image of a subject which is present in a predetermined area. The camera device 200, for example, includes an omni-directional camera and a PTZ camera and operates as a network camera.

The PTZ camera as an example of the camera device 200 is a camera capable of changing the image capturing area (image capturing direction and zoom factor) by a PTZ operation. The PTZ operation is an operation that includes at least one of panning (P), tilting (T), and zooming (Z). In addition, the PTZ camera is controlled in PTZ by the control device 100. The PTZ control is a control that includes at least one of the panning control (P), the tilting control (T), and the zooming control (Z).

The omni-directional camera as an example of the camera device 200 captures an omni-directional image in all area. The omni-direction (all direction) means, for example, all around (360 degrees) of the camera device 200 (for example, all direction of planes along the X-Y plane). In the omni-directional camera, the PTZ operation is implemented by software. An arbitrary area in the capturable area of the omni-directional camera is masked (unselected) by the control device 100 or the camera device 200 after the image capturing in the omni-directional image capturing area.

The shutter 300 is driven by a drive member in response to the instruction signal from the control device 100 and then opened and closed. Therefore, the shutter 300 limits the image capturing area captured by the camera device 200. Namely, the image capturing area is narrowed when the shutter 300 closes, and the image capturing area is widened when the shutter 300 opens.

The shutter 300, in a closed state, visually obstructs the front surface of the camera lens 260 (refer to FIG. 2A) in the image capturing direction of the camera device 200. As a result, the image capturing by the camera device 200 becomes impossible. In addition, the shutter 300, in an open state, visually opens the front surface of the camera lens 260 (refer to FIG. 2C) in the image capturing direction of the camera device 200. As a result, the image capturing by the camera device 200 becomes possible.

When the shutter 300 is in the open state, the camera lens 260 is in a state of being visible and recognizable by a person who exists in the area where the camera device 200 is disposed. The shutter 300 may be in an intermediate state in which a part of the image capturing area of the camera device 200 is limited (refer to FIG. 2B). In the intermediate state, there may be a plurality of states according to a degree of limitation.

Another example of the structure of the shutter 300 is, for example, described in U.S. Pat. No. 8,123,419, the contents of which are incorporated herein by reference.

One or more camera devices 200 and shutters 300 are respectively provided in the monitoring system 1000. For example, one shutter 300 is provided for each camera device 200. The shutter 300 may not be provided separately from the camera device 200, but the shutter 300 and the camera device 200 may be configured integrally with each other as illustrated by a reference numeral 450 in FIG. 1.

The sensor 510 includes various sensors that measure, for example, a mechanical, an electromagnetic, a thermal, an acoustic, or a chemical property in the predetermined area, and convert the measured result to a predetermined signal. The sensor 510 broadly includes, for example, a motion sensor, a smoke sensor (a smoke detector), a human sensor, a door opening and closing sensor, a window opening and closing sensor, an infrared sensor, a light sensor, a magnetic sensor, a temperature sensor, a voice sensor, a distance measuring sensor, a position sensor, and other sensors.

The emergency button 520 includes, for example, an emergency button fixedly installed in the predetermined area.

The mobile terminal 530 includes, for example, a smart phone, a personal digital assistant, a pendant microphone (a pendant-type infrared wireless microphone), various remote controllers, a portable emergency warning apparatus, a personal computer (PC), and other operational equipment.

Another system 540 includes, for example, a visiting and leaving management system that manages the visiting and leaving in a predetermined area, and an authentication system that authenticates a person to enter a predetermined area.

In a case where the sensor 510 detects predetermined information, the sensor 510, for example, informs the control device 100 of the predetermined information via the network.

The emergency button 520 is pressed by a person who exists in a predetermined area, and for example, informs the control device 100 of the information indicating that the emergency button 520 is pressed, via the network.

The sensor 510 or the emergency button 520 may be incorporated in the camera device 200. Alternatively, one or more sensors 510 or the emergency buttons 520 may be provided for each predetermined area, or one or more sensors 510 or the emergency buttons 520 may be provided for each camera device 200.

The mobile terminal 530 is, for example, possessed by a user, and includes a communication unit, operation unit, control unit, and various sensors. The mobile terminal 530 informs, for example, when predetermined information is detected or a predetermined button is pressed, the control device 100 of the predetermined information or the information indicating that the predetermined button is pressed, via the network.

The other system 540 includes, for example, various systems provided separately from the monitoring system 1000 (for example, the visiting and leaving management system 2000 (refer to FIG. 7) and the authentication system). The other system 540 informs the control device 100 in the monitoring system 1000, for example, of the information obtained by the processing in the other systems 540 via, for example, the network.

The information from at least one of the sensor 510, the emergency button 520, the mobile terminal 530, and the other systems 540 may be reported to the camera device 200 instead of being reported to the control device 100.

The display device 600 is disposed, for example, at the monitoring center. As a result, a security guard can visually recognize and monitor the predetermined area. The display device 600 may be, for example, a large screen display installed at the monitoring center or may be a small display on a mobile terminal which the security guard has for security activity. In the display device 600, for example, a plurality of areas may be displayed on the divided screen, or a captured image of one area combined with information about the area may be displayed on the screen.

For example, warning information may be displayed on the display device 600 in a case where a threat occurs in a predetermined area. Alternatively, the warning information may be transmitted to another communication device, and inform by, for example, image or sound, instead of being displayed on the display device 600.

Figure 2A:
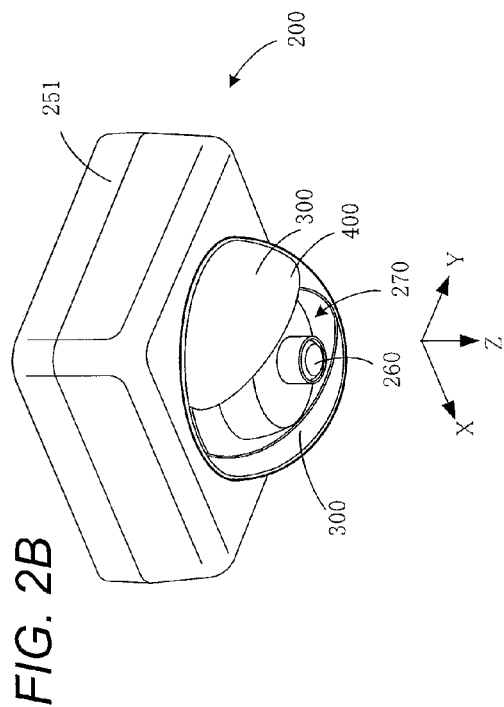
FIG. 2A is a perspective view illustrating an example of a structure in the vicinity of a camera device and a shutter when the shutter is in an open state in the embodiment.
Figure 2B:
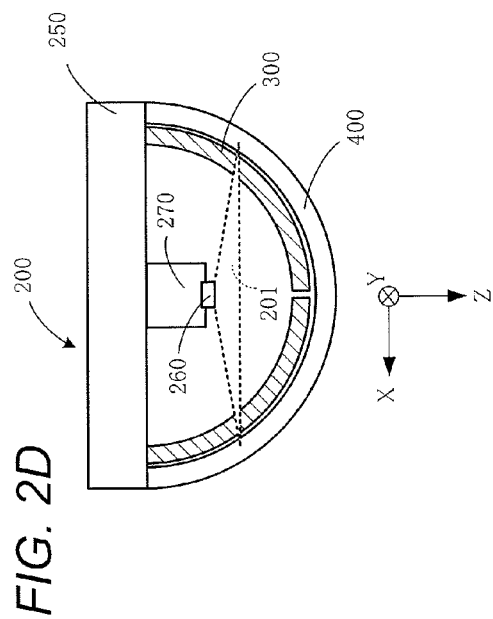
FIG. 2B is a perspective view illustrating an example of a structure in the vicinity of a camera device and a shutter when the shutter is in an intermediate state in the embodiment.
Figure 2C:
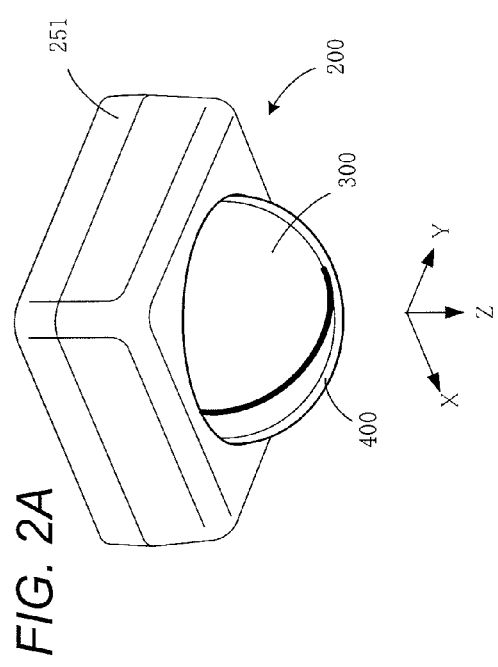
FIG. 2C is a perspective view illustrating an example of a structure in the vicinity of a camera device and a shutter when the shutter is in the closed state in the embodiment.
Figure 2D:
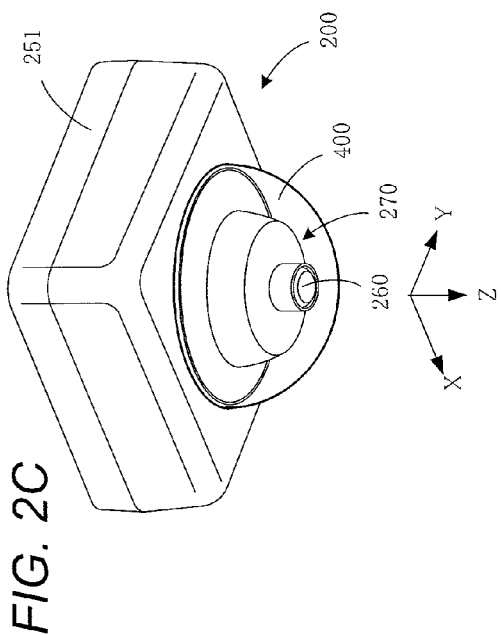
FIG. 2D is a cross-sectional view illustrating an example of a structure in the vicinity of a camera device and a shutter in the embodiment.

Next, an example of a structure in the vicinity of the camera device 200 and the shutter 300 will be described. FIGS. 2A to 2D are perspective views illustrating the structure in the vicinity of the camera device 200 and the shutter 300. FIG. 2A illustrates a case of the shutter 300 being in an open state. FIG. 2B illustrates a case of an intermediate state where the shutter 300 is in the state between the open state and the closed state. FIG. 2C illustrates a case of the shutter 300 being in a closed state. FIG. 2D is a cross-sectional view illustrating the example of the structure in the vicinity of the camera device 200 and the shutter 300 illustrated in FIG. 2A.

In FIGS. 2A to 2D, the camera device 200 includes at least an optical unit 270 and a camera base 250. The camera device 200 is covered with a housing 251 and a transparent cover 400. The camera device 200 is installed and fixed, for example on the wall or ceiling in a predetermined area.

The optical unit 270 is mounted on the camera base 250 via a predetermined holding mechanism. The optical unit 270 includes a camera lens 260 and a lens holder. An unillustrated board is incorporated in the camera base 250. Various electronic components are mounted on the board. The electronic components include, for example, components for supplying a power to the components in the camera device 200, outputting some images, or executing image processing, and include a digital signal processor (DSP) as described later.

FIG. 2A illustrates the state of the shutter 300 being closed. In this case, since the shutter 300 has a substantially semispherical dome-shape, the optical unit 270 cannot be visually recognized from the surroundings. In addition, in a case where the shutter 300 is in the closed state, an image capturing area 201 of the camera device 200 is limited to the inside of the shutter 300, which is the state of the image capturing being impossible.

The open and closed state of the shutter 300 is changed by a drive member (not illustrated). In a case where the shutter 300 is in the open state by an operation of the drive member as illustrated in FIG. 2C, at least a part of the substantially dome-shaped shutter 300 is opened along the substantially semispherical surface from the front of the image capturing direction, and is accommodated, for example, in the camera base 250. In a case where the shutter 300 is in the open state, the optical unit 270 can be visually recognized from the front of the image capturing direction. In a case where the camera base 250 is mounted on the ceiling, for example, it means that the front of the image capturing direction is a downward direction (positive direction on a Z-axis).

The camera base 250 may include a drive member for opening and closing the shutter 300. The board may be incorporated in the optical unit 270.

The transparent cover 400 is formed of, for example, a transparent material and a translucent material, and surrounds the shutter 300 which houses or exposes the camera device 200. The optical unit 270 is, even in a case where the shutter 300 is in the open state, surrounded by the camera base 250 (refer to FIG. 2A) and the transparent cover 400. The transparent material and the translucent material include, for example, polymethyl methacrylate (PMMA) and polycarbonate (PC).

By covering the optical unit 270 with the transparent cover 400, the camera device 200 can have, for example, excellent waterproofness, dust resistance and light resistance. By applying a hydrophilic coating on the surface of the transparent cover 400, it is possible to improve weather resistance of the transparent cover 400 itself. In addition, influence by the transparent cover 400 on the captured image is equal to or lower than a predetermined level, and it is possible to sufficiently secure the security by analyzing the captured image.

Next, the configuration example of the control device 100 will be described.

Figure 3:
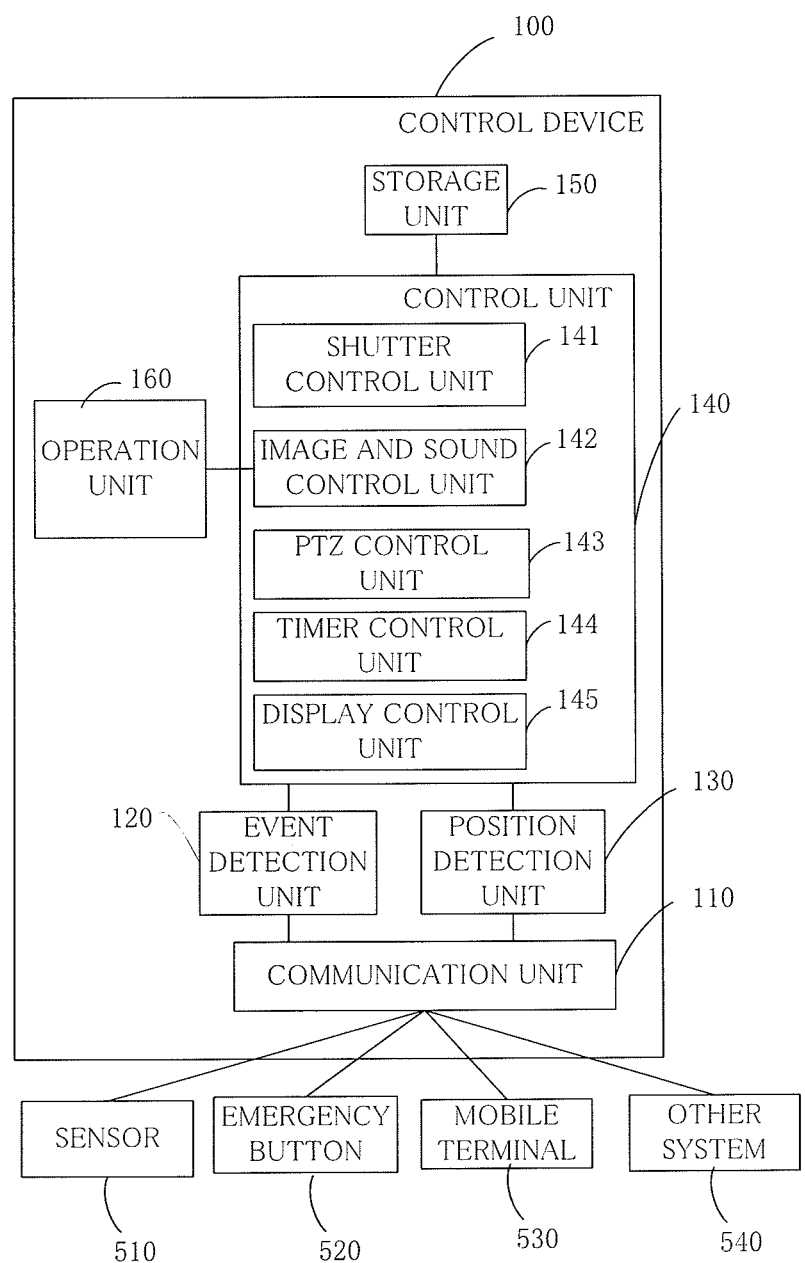
FIG. 3 is a block diagram illustrating a configuration example of a control device in the embodiment.

FIG. 3 is a block diagram illustrating the configuration example of the control device 100. The control device 100 includes a communication unit 110, an event detection unit 120, a position detection unit 130, a control unit 140, a storage unit 150, and an operation unit 160.

The communication unit 110 communicates various kinds of information, for example, with the sensors 510, the emergency button 520, the mobile terminal 530, or the other system 540. The communication unit 110 may communicate via the wired network or via the wireless network. In addition, the communication unit 110 may perform communication such as infrared communication, short range communication, and others.

The communication unit 110 receives the measured information measured by the sensors 510 or information indicating that the emergency button 520 is pressed. In addition, for example, the communication unit 110 receives the information detected by the mobile terminal 530 or the information indicating that a predetermined button is pressed. In addition, the communication unit 110 receives the information obtained by a processing in the other system 540.

The event detection unit 120 detects an event of opening and closing of the shutter 300 based on information received by the communication unit 110 from each device. The event includes, for example, an opening event for opening the shutter 300 and a closing event for closing the shutter 300. For example, the opening event is detected in a case where the threat level is comparatively high, and the closing event is detected in a case where the threat level is comparatively low. The state where the threat level is comparatively high includes, for example, a state where the sensor 510 reacts, and the state where the threat level is comparatively low includes, for example, a state where the sensor 510 does not react.

The event detection unit 120 determines that it is the opening event in a case where, for example, the emergency button 520 is pressed and the emergency warning is received by the communication unit 110 and in a case where information of an authentication error is received by the communication unit 110. In addition, the event detection unit 120 determines that it is the opening event in a case where, for example, a suspicious person enters the predetermined area (for example, in a classroom) and the information is reported by a teacher's mobile terminal. In addition, the event detection unit 120 determines that it is the opening event in a case where, for example, a suspicious person is detected in the visiting and leaving management system or in a case where an authentication error is detected in the authentication system.

In addition, the event detection unit 120 determines that it is the closing event in a case where, for example, the teacher in class requests via a smart phone for the shutter 300 to be closed for the protection of the privacy, and the request signal is received by the communication unit 110. In addition, the event detection unit 120 determines that it is the closing event in a case where a predetermined amount of time has passed since the opening event is detected (received).

The position detection unit 130 identifies a device that transmits the information received by the communication unit 110, and detects a position where the device exists or is installed. The position may be detected, for example, using an Internet Protocol (IP) address of the camera device 200 arranged in a predetermined area or a Media Access Control (MAC) address. In addition, the position may be detected using a host name that is uniquely given to the camera device 200. In addition, for example, in a case where the device is a mobile device, the position may be detected using the Global Positioning System (GPS).

The control unit 140 integrally administrates each unit in the control device 100. In addition, the control unit 140 includes a shutter control unit 141, an image and sound control unit 142, a PTZ control unit 143, a timer control unit 144, and a display control unit 145. The control unit 140 realizes various functions by, for example, a control program stored in the storage unit 150 being executed by a CPU.

The shutter control unit 141 controls the opening and closing of the shutter 300. The image and sound control unit 142 controls such that the image captured by the camera device 200 is recorded, or the voice collected by the microphone is recorded.

The PTZ control unit 143 instructs the camera device 200 to perform, for example, the PTZ control in a predetermined timing. For example, the PTZ control unit 143 controls the image capturing area or the image capturing direction of the camera device 200 according to the position information of the sensor 510 which detects a predetermined event.

The timer control unit 144 measures, for example, current time or any period of time. For example, the display control unit 145 generates a display screen from the image captured by the camera device 200, and instructs the display device 600 so as to display the display screen, according to the screen size of the display device 600.

The storage unit 150 stores various kinds of information, various programs, and information about various tables. In addition, for example, information of the image captured by the camera device 200 and information of the voice collected by the camera device 200 may be obtained from the camera device 200 via the communication unit 110, and may be stored in the storage unit 150.

The operation unit 160 receives various operations. As an operation unit 160, which can instruct the control unit 140, for example, a key input unit, a predetermined button, a mouse, a keyboard, a microphone, and a touch panel can be considered.

Figure 4:
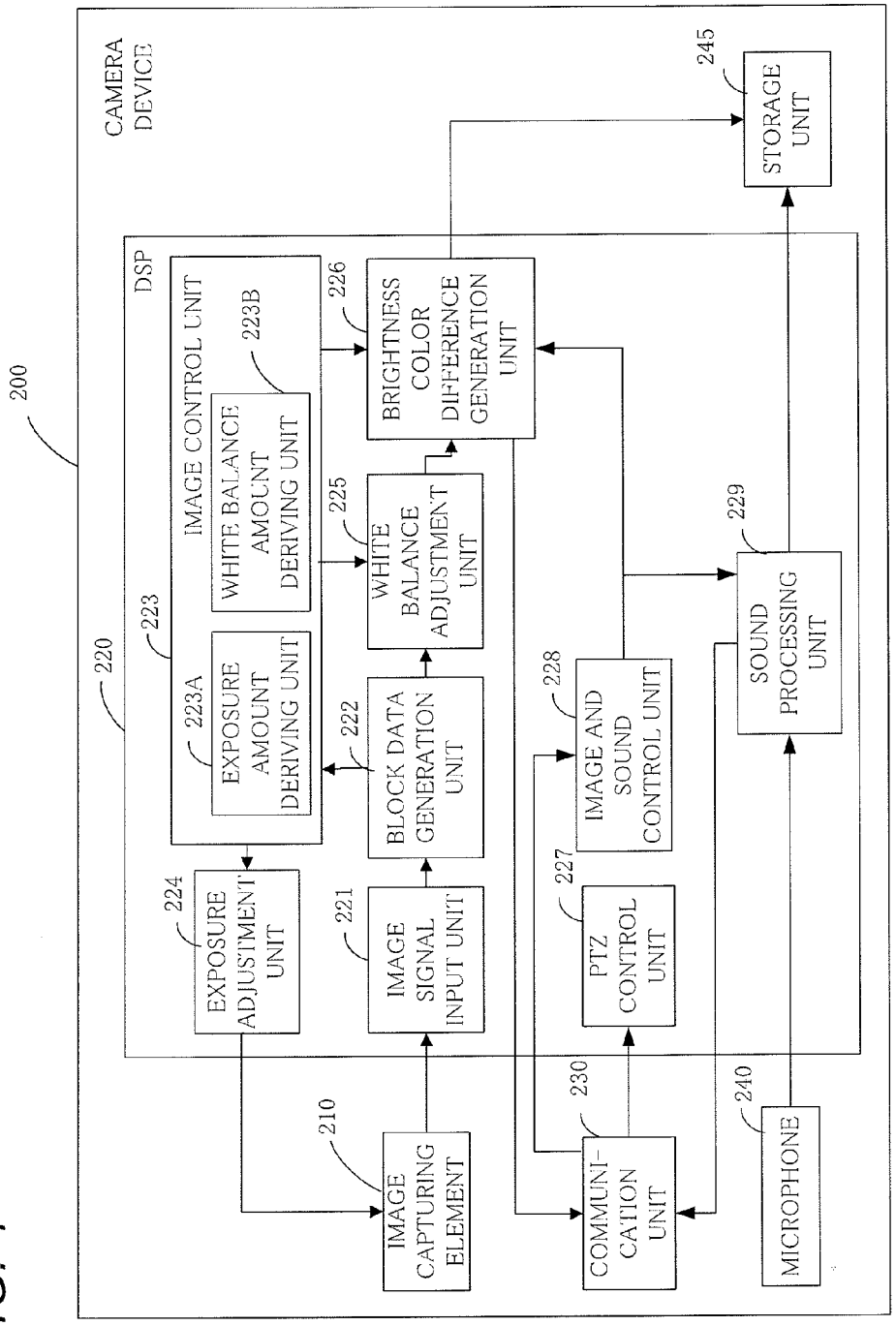
FIG. 4 is a block diagram illustrating a configuration example of a camera device in the embodiment.

Next, a configuration example of the camera device 200 will be described. FIG. 4 is a block diagram illustrating the configuration example of the camera device 200. The camera device 200 includes an image capturing element 210, a Digital Signal Processor (DSP) 220, and a communication unit 230.

The image capturing element 210 includes, for example, a Charge Coupled Device (CCD) or a Complementary Metal Oxide Semiconductor (CMOS) image sensor. The DSP 220 performs a predetermined signal processing with respect to the image signal obtained from the image capturing element 210.

The communication unit 230 is connected to the control device 100 via the network, and communicates with the control device 100 on various kinds of information. The network may be either a wired network or a wireless network. The communication unit 230 receives, for example, information about the direction of the camera device 200, or control information (for example, panning control information, tilt control information or zoom control information) which controls the image capturing area, from the control device 100.

In addition, the communication unit 230 may receive, for example, detection information or information about the detection result from the sensor 510, the emergency button 520, the mobile terminal 530, and at least one of the other systems 540. In this case, the communication unit 230 transmits the received information to the control device 100, and the opening and closing control of the shutter 300 is performed by the control device 100.

In the present embodiment, the shutter 300 is controlled by the control device 100. Alternatively, the shutter 300 may be controlled by the camera device 200. In this case, the control signal is transmitted to the shutter 300 from the communication unit 230, and the opening and closing control of the shutter 300 is performed.

The microphone 240 acquires a sound signal (for example, a voice) surrounding the microphone 240 to convert the signal to an electric signal.

The storage unit 245 stores various kinds of information, various programs, and information about various tables. In addition, the information about the camera device 200 kept in the control device 100 may be kept in the storage unit 245 of the camera device 200.

The DSP 220 includes an image signal input unit 221, a block data generation unit 222, an image control unit 223, an exposure adjustment unit 224, a white balance adjustment unit 225, and a brightness color difference generation unit 226. In addition, the DSP 220 includes a PTZ control unit 227, an image and sound control unit 228, and a sound processing unit 229.

The image signal input unit 221 receives an image signal from the image capturing element 210. The block data generation unit 222 divides all of the pixels of the image capturing element 210 into a plurality of blocks with a predetermined size, adds a pixel value to a color filter (each RGB filter) for each divided block, and generates block data.

The image control unit 223 includes, for example, an exposure amount deriving unit 223A and a white balance amount deriving unit 223B. The exposure amount deriving unit 223A receives the block data from the block data generation unit 222 and derives (for example, calculates) an exposure amount based on the block data. The white balance amount deriving unit 223B receives the block data from the block data generation unit 222 and derives a white balance amount based on the block data.

The exposure adjustment unit 224 adjusts the exposure amount of the image capturing element 210 using the exposure amount derived by the exposure amount deriving unit 223A. The white balance adjustment unit 225 adjusts the white balance of the block data using the white balance amount derived by the white balance amount deriving unit 223B.

The brightness color difference generation unit 226 generates brightness data Y, and color difference data Cb and Cr as exemplified below is adjusted, from the block data (RGB data) of the white balance.

$Y=0.299 \times R+0.587 \times G+0.114 \times B$ $Cb=-0.169 \times R-0.331 \times G+0.500 \times B$ $Cr=0.500 \times R-0.419 \times G-0.081 \times B$ The PTZ control unit 227 controls, for example, the direction of the camera device 200 based on the control information received by the communication unit 230. For example, the PTZ control unit 227 may control the direction in a horizontal direction of the camera device 200 based on the panning control information from the control device 100. In addition, the PTZ control unit 227 may control the direction in a vertical direction of the camera device 200 based on the tilt control information from the control device 100. The PTZ control unit 227 causes, for example, a motor (not illustrated) to rotate and causes the camera device 200 to pan or tilt for each predetermined angle.

In addition, the PTZ control unit 227 may control the image captured by the camera device 200 so as to be enlarged (zoom-in) or reduced (zoom-out) based on the zoom control information from the control device 100. In a case where the direction of the camera device 200 is controlled, the direction of the entire camera device 200 may be controlled or the direction of the camera lens 260 of the camera device 200 may be controlled.

In a case where the camera device 200 is an omni-directional camera, the PTZ control in the camera device 200 is implemented in software.

The image and sound control unit 228, for example, controls such that the image captured by the image capturing element 210 is recorded and the voice collected by the microphone 240 is recorded in the storage unit 245, according to the instruction signal (control signal) from the control device 100. In addition, the image and sound control unit 228, for example, controls such that the recording of the captured image is stopped and the recording of the collected voice is stopped according to the instruction signal from the control device 100.

The recorded image or sound information to be stored in the storage unit 245 may be stored in other memory than the storage unit 245. For example, the information may be stored in an external storage medium such as an SD card mounted on the camera device 200 or the like. In addition, for example, the information may be transmitted to the control device 100 and be kept in the control device 100.

The sound processing unit 229 performs a predetermined signal processing with respect to an electric signal from the microphone 240.

Moreover, the case where the microphone 240 collecting the surrounding sound in the predetermined area is included in the camera device 200 is illustrated. However, the microphone 240 may be provided separate from the camera device 200.

Next, the environment for installation of the camera device 200 will be described.

The camera device 200 is, for example, installed on the ceiling or on the wall surface in a predetermined privacy-sensing area where both the security securing and the privacy protection are required. The privacy-sensing area is one of the predetermined areas. The privacy-sensing area is, for example, a part or the whole of a company, a classroom, a restroom, a dressing room, a library, a locker room, or a conference room.

In each privacy-sensing area, a privacy threshold value is assigned depending on importance of the privacy protection. For example, when the importance of the privacy protection is higher, a larger value is assigned as a privacy threshold value, and when the importance of the privacy protection is lower, a smaller value is assigned as a privacy threshold value. For example, in the privacy-sensing area such as in a restroom or a dressing room, a comparatively larger privacy threshold value is assigned, and in the privacy-sensing area such as in a library, a comparatively smaller privacy threshold value is assigned. When the privacy threshold value assigned is comparatively large, for example, in a case where a predetermined event is detected by a plurality of sensors 510, the shutter 300 is merely opened but the captured image is not recorded. Thus the privacy can be protected as much as possible. In addition, when the privacy threshold value assigned is comparatively small, for example, even in a case where a predetermined event is detected by one sensor 510, the captured image is recorded while the shutter 300 is opened. Thus, the privacy is not protected compared to the case where the privacy threshold value is large.

For example, for each privacy-sensing area, one or more camera devices 200 are installed. In addition, the camera device 200 for which the privacy-sensing area is included in the image capturing area may be installed outside the privacy-sensing area.

In addition, the sensor 510 and the emergency button 520 may be installed, for example, in the privacy-sensing area. The mobile terminal 530 may, for example, be owned by a user located in the privacy-sensing area. At least a part of the other system 540, for example, may or may not be installed in the privacy-sensing area.

The image capturing area of the camera device 200 includes, for example, at least a part of the detection range of one or more sensors 510 installed in a fixed manner or at least a part of the target warning range of the emergency button 520. Each camera device 200 is preset so that the direction of each camera device 200 is adjusted in such a manner that the predetermined privacy-sensing area is included in the image capturing area. In addition, the number of preset position of each camera device 200 may be more than one, for example, the preset position may be prepared in advance for each sensor 510 which detects the information regarding the occurrence of an abnormality. In this case, for example, the sensor 510 which detects the information regarding the occurrence of the abnormality and the information regarding the preset position of the camera device 200 are stored in the control device 100 or in each camera device 200 in advance in association with each other.

Figure 5:
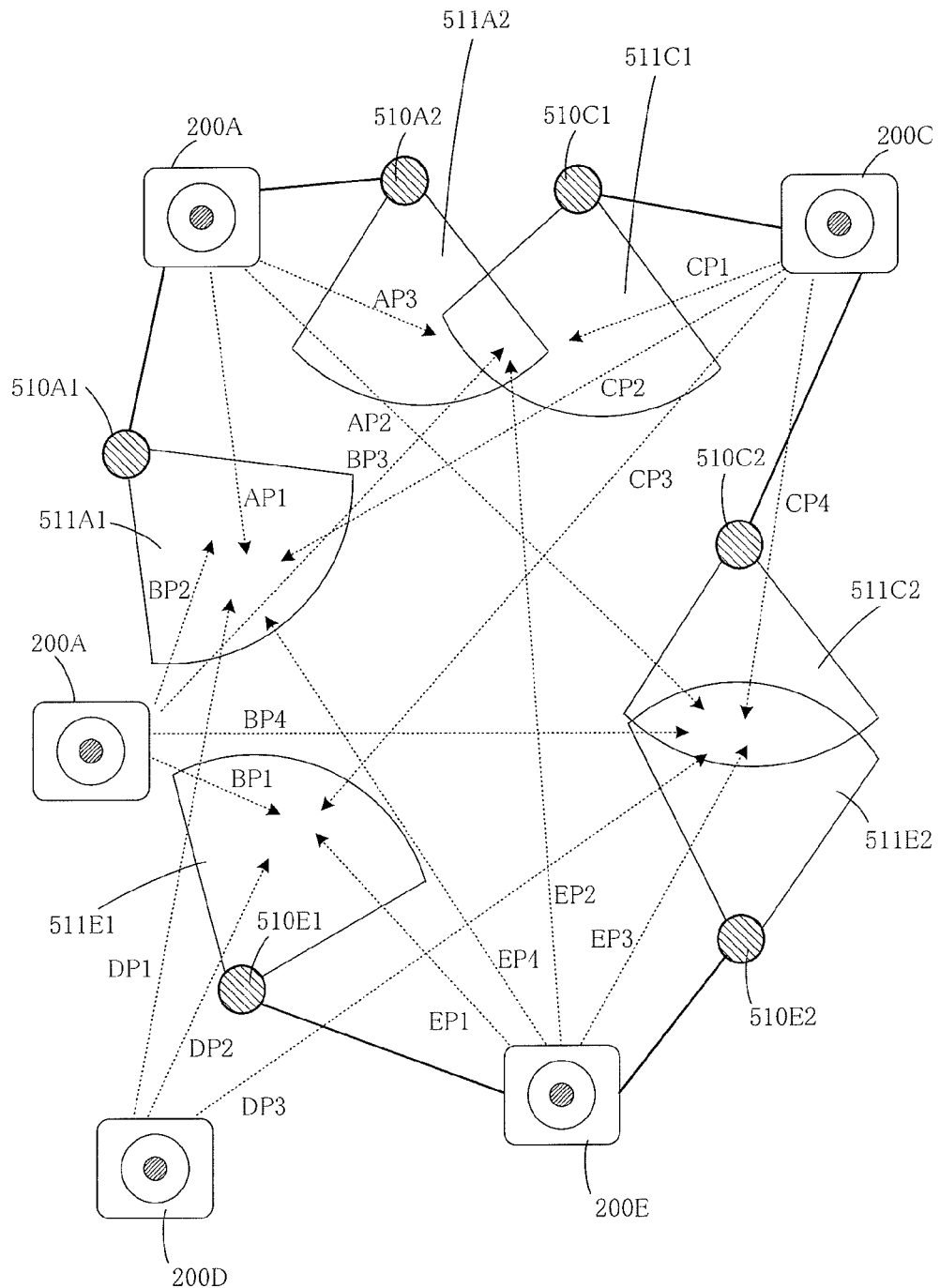
FIG. 5 is a schematic diagram illustrating an example of an arrangement of camera devices, an example of an arrangement of sensors, an example of image capturing areas of the camera devices, and an example of detection ranges of the sensors in the embodiment.

FIG. 5 is a schematic diagram illustrating an arrangement example of the camera devices 200, an arrangement example of the sensors 510, an example of image capturing areas of the camera devices 200, and an example of detection ranges of the sensors 510. As illustrated in FIG. 5, five camera devices 200 (200A to 200E) and 6 sensors (510A1, 510A2, 510C1, 510C2, 510E1, and 510E2) are installed in the privacy-sensing area. Here, a description mainly related to the camera device 200A will be given.

In FIG. 5, the sensors 510A1 and 510A2 are connected to and three preset positions AP1 to AP3 are set to the camera device 200A. The sensors 510C1 and 510C2 are connected to and four preset positions CP1 to CP4 are set to the camera device 200C. The sensors 510E1 and 510E2 are connected to and four preset positions EP1 to EP4 are set to the camera device 200E. Moreover, the sensor 510 is not connected to either of the camera devices 200B or 200D, and four preset positions BP1 to BP4 are set to the camera device 200B and three preset positions DP1 to DP3 are set to the camera device 200D.

For example, the preset position AP1 is corresponding to the detection range 511A1 of the sensor 510A1, preset position AP2 is corresponding to the detection ranges 511C2 and 511E2 of the sensors 510C2, 510E2, respectively, and the preset position AP3 is corresponding to the detection ranges 511A2 and 511C1 of the sensors 510A2 and 510C1, respectively.

That is, when the camera lens 260 of any one of the camera devices 200A to 200E is turned to the preset position AP1, it is possible to capture an image including the detection range 511A1 of the sensor 510A1. In addition, when the camera lens 260 of any one of the camera devices 200A to 200E is turning to the preset position AP2, it is possible to capture an image including the detection ranges 511C2 and 511E2 of the sensors 510C2 and 510E2, respectively. In addition, when the camera lens 260 of any one of the camera devices 200A to 200E is turning to the preset position AP3, it is possible to capture an image including the detection ranges 511A2 and 511C1 of the sensors 510A2 and 510C1.

In FIG. 5, a case where a plurality of the camera devices 200 and the sensors 510 are installed in one privacy-sensing area is illustrated. Alternatively, for example, the privacy-sensing area may be divided by a wall surface, and the camera devices 200 may be installed for each divided privacy-sensing area.

FIG. 6 is a schematic diagram illustrating an example of an information table T11 which indicates the relationship between each sensor 510 and a preset position of each camera device 200. The information table T11 is stored in the storage unit 150.

The information table T11 holds, for example, the identification information (for example, IP address) of each camera device 200A to 200E and the identification information (for example, sensor ID) of each sensor 510 in association with each other. The information table T11 includes, for example, information indicating that the preset position AP1 of the camera device 200A (IP address: IpA) is corresponding to the detection range 511A1 of the sensor 510A1. In addition, the information table T11 includes information indicating that the preset position BP2 of the camera device 200B (IP address: IpB) is corresponding to the detection range 511A1 of the sensor 510A1. In addition, the information table T11 includes information indicating that the preset position CP2 of the camera device 200C (IP address: IpC) is corresponding to the detection range 511A1 of the sensor 510A1. In addition, the information table T11 includes information indicating that the preset position DP1 of the camera device 200D (IP address: IpD) is corresponding to the detection range 511A1 of the sensor 510A1. In addition, the information table T11 includes information indicating that the preset position EP4 of the camera device 200E (IP address: IpE) is corresponding to the detection range 511A1 of the sensor 510A1.

In addition, the control device 100 may hold an information table (not illustrated) in which a sensor of another camera having a common detection range is associated with each sensor 510 (for example, sensor 510A1 and 510A2). In the information table, the sensor 510C1 of the camera device 200C is in associated with the sensor 510A2, the IP address of the camera device 200C is stored.

In FIG. 5, a case where the sensors 510 are connected to the camera devices 200 is illustrated. Alternatively, instead of the sensors 510, the emergency button 520, the mobile terminal 530, or the other system 540 may be connected thereto. In addition, at least two of the sensor 510, the emergency button 520, the mobile terminal 530, or the other system 540 may be mixed in the privacy-sensing area.

The detection range 511 may or may not be overlapped by a plurality of sensors 510. In addition, the image capturing area by a plurality of camera devices 200 may or may not be overlapped.

The control device 100 instructs the camera device 200 (for example, the camera device 200A), with reference to the information table T11, to capture the image of a detection range (for example, the detection range 511A1) where an abnormality is expected to occur, for example.

Next, as one example of the other system 540, the visiting and leaving management system 2000 will be described.

Figure 7:
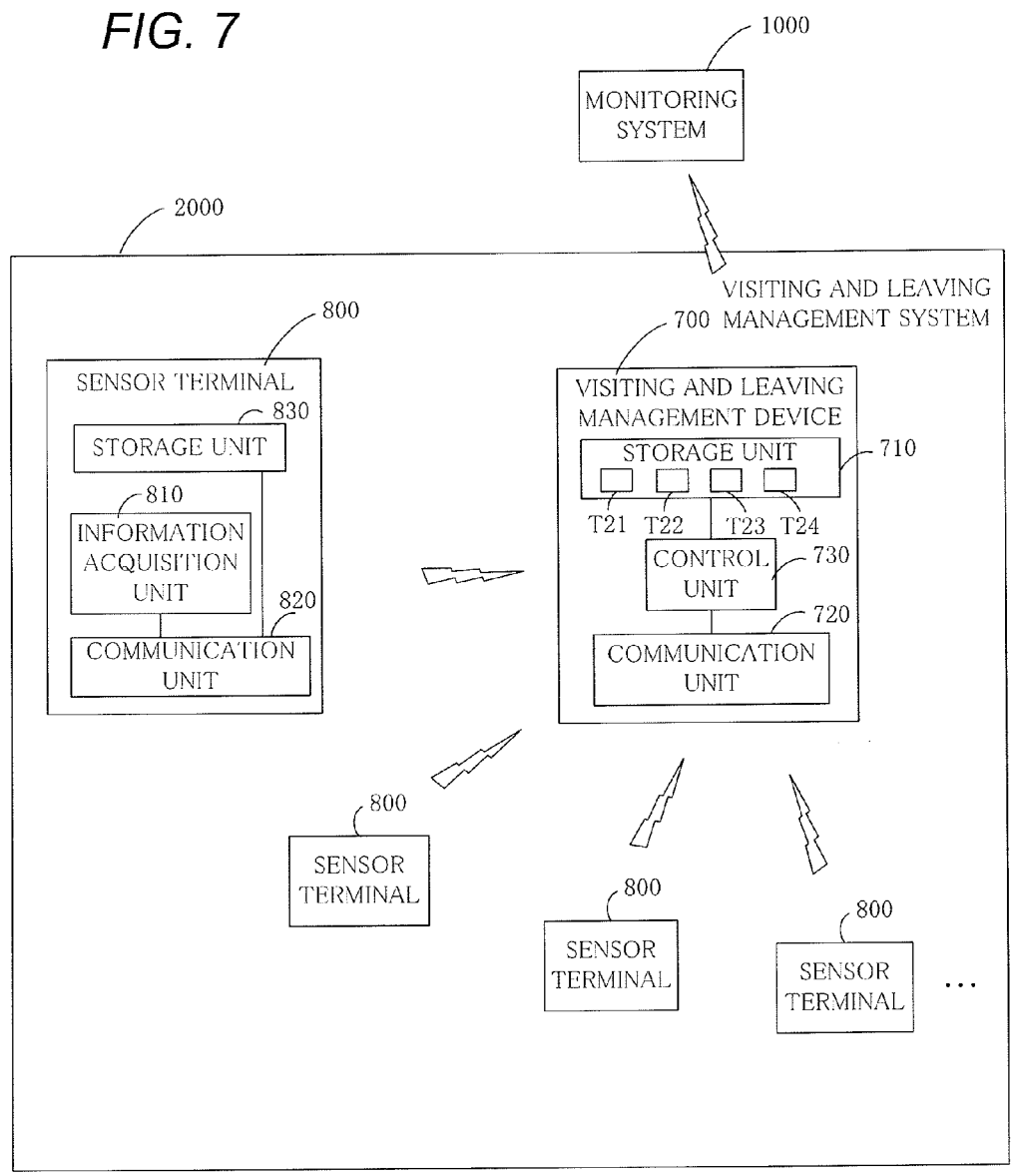
FIG. 7 is a block diagram illustrating a configuration example of a visiting and leaving management system in the embodiment.

FIG. 7 is a block diagram illustrating a configuration example of a visiting and leaving management system 2000. The visiting and leaving management system 2000 includes, for example, a visiting and leaving management device 700 and a sensor terminal 800. The visiting and leaving management device 700 and one or more sensor terminals 800 are connected to each other via a network.

The visiting and leaving management device 700 manages at least one of the visitors who enter a predetermined area and the leaving persons who leave the predetermined area. Here, it is assumed that the visitors or the leaving persons have IC cards for the management of visiting and leaving, but not limited to the IC card. In addition, for example, the functions of IC cards may be incorporated in the mobile terminal. The sensor terminal 800 is installed inside or outside of the predetermined area where the visiting and leaving is managed.

The sensor terminal 800 includes an information acquisition unit 810, a communication unit 820, and a storage unit 830. The sensor terminal 800 includes, for example, a memory and a processor, and realizes various functions (for example, an IC card reading function, an information transmission function) by the CPU executing a control program stored in the memory. Moreover, each function may be realized by a dedicated hardware instead of the software.

The information acquisition unit 810 acquires various kinds of information. For example, the information acquisition unit 810 is a card reader, and reads the card ID stored in the IC card from the IC card which is held by the bearer of the IC card, and informs the communication unit 820.

The communication unit 820 communicates, for example, various kinds of information to the visiting and leaving management device 700 via a wired network or a wireless network. For example, the communication unit 820 transmits the information about the card ID from the information acquisition unit 810 and the information about the terminal ID which identifies the sensor terminal and is stored in the storage unit 830, to the visiting and leaving management device 700.

The visiting and leaving management device 700 includes a storage unit 710, a communication unit 720, and a control unit 730.

The storage unit 710 stores various kinds of information, various tables, and a control program. The storage unit 710 stores, for example, a sensor signal holding table T21, a card information holding table T22, a visitor information holding table T23, and a leaving information holding table T24. Adding, modifying, and removing data to and from the sensor signal holding table T21 and the card information holding table T22 are implemented based on the input to the operation unit (not illustrated).

The communication unit 720 communicates with another communication device or another system (for example, the monitoring system 1000) via a wired network or a wireless network. For example, with respect to the monitoring system 1000, the communication unit 720 transmits the information on whether or not a person exists in the predetermined area. In addition, with respect to the monitoring system 1000, when a person's visiting or leaving occurs in the predetermined area, the communication unit 720 may sequentially transmit the information on the visiting or leaving (for example, information on the visitor, the leaving person, the visiting time, the leaving time, the visiting area, and the leaving area).

The control unit 730 realizes, for example, various functions (for example, an authentication processing function, a visitor information generation function, and a leaving determination function) by an execution of the control program stored in the storage unit 710 by a CPU. Moreover, various functions may be realized by a dedicated hardware instead of the software. The information on visiting and leaving is held, for example, in the visitor information holding table T23 and the leaving information holding table T24.

The sensor information holding table T21 has information indicating a correspondence between each sensor and the area where each sensor is installed. The sensor information holding table T21 holds, for each sensor terminal 800, for example, information on the sensor ID, the installation area, the area ID, and the name of area in association with each other. The sensor information holding table T21 is referenced in the authentication processing.

The sensor ID is identification information which identifies the sensor terminal 800. The installation area indicates information about the location where the sensor terminal 800 is installed. The area ID is identification information which identifies the area where predetermined information is detected by the sensor terminal 800.

The card information holding table T22 has information indicating a correspondence between the IC card used for visiting and leaving and the area where the visiting and leaving is permitted by each IC card. The card information holding table T22 holds, for each IC card, for example, information on the card ID, the name, and the permitted area ID in association each other. The card information holding table T22 is referenced in the authentication processing.

The card ID is identification information which is recorded in the IC card and identifies the IC card. The name is an IC card bearer's name, for example. The permitted area ID is identification information which identifies the area where the visiting and leaving is permitted by the IC card.

The visitor information holding table T23 has information indicating a correspondence between each visitor and the area each visitor has entered. The visitor information holding table T23 holds, for each visitor, for example, information on the visitor card ID, the visitor's name, the visiting area ID, the visiting area name, and the visiting time in association with each other. The visitor information holding table T23, for example, is referenced in a case where the control unit 730 determines whether the visitor information is recorded or removed, and is updated according to the determination result.

The visitor card ID is identification information which identifies the IC card used when the visitor enters. The ID card is included in the card ID held in the card information holding table T22. The visitor's name is, for example, a name of the visitor. The visiting area ID is identification information which identifies the area where the visitor enters, and is an area ID held in the sensor information holding table T21 in association with the sensor ID of the sensor terminal 800 installed in the area. The visiting area name is the area name held in the sensor information holding table T21 in association with the corresponding area ID.

The leaving information holding table T24 has, for example, at the time point when the shutter 300 is opened, information indicating the leaving status of the visitor who has entered each area, at a predetermined time point. The leaving information holding table T24 holds, for each entering visitor when the shutter 300 is in the open state, the card ID, the name, the area ID, the area name, and the leaving information in association with each other. The leaving information holding table T24 is, for example, referenced when the control unit 730 determines the leaving, and is updated.

The visitor's card ID, the visitor's name and the visiting area name in the leaving information holding table T24, for example, are similar to the visitor's card ID, the visitor's name, and the visiting area name held in the visitor information holding table T23 at the time point when the shutter 300 is in the open state. In addition, the leaving information is information indicating whether the visitor has left or not.

The storage unit 710 may not include the leaving information holding table T24, and when the visitor has left, the control unit 730 may remove the information about the visitor who has left, from the visitor information holding table T23. Even in this case, a person in the area can be recognized.

Here, separately from the monitoring system 1000, a case of the visiting and leaving management system 2000 is described. Alternatively, the configuration units of the monitoring system 1000 and the configuration units of the visiting and leaving management system 2000 may be partly at least in common. For example, at least a part of the storage unit, the communication unit, the control unit, the area (the privacy-sensing area), and the sensor (the sensor terminal) may be partly shared in both systems.

Figure 8:
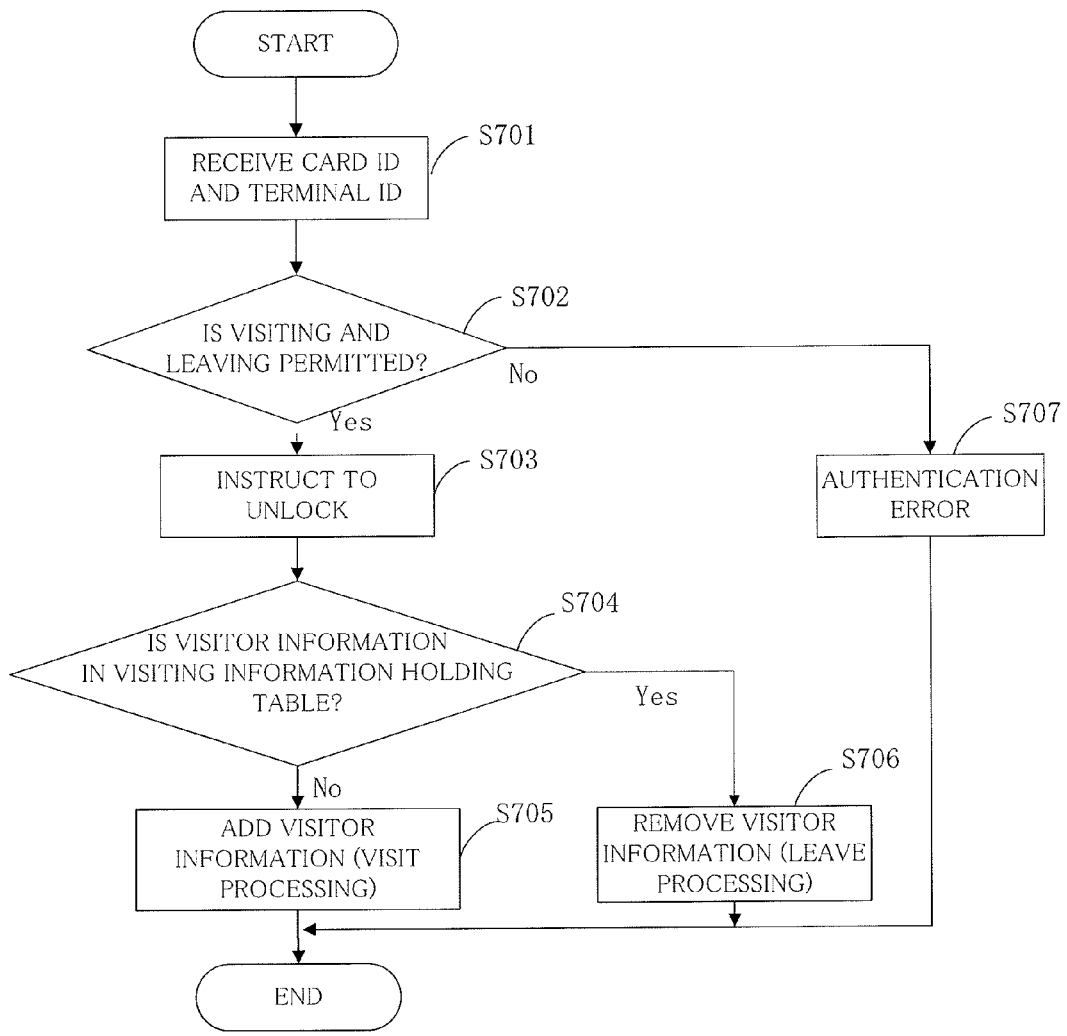
FIG. 8 is a flowchart illustrating an example of an operation of the visiting and leaving management system in the embodiment.

Next, an example of an operation of the visiting and leaving management device 700 will be described. FIG. 8 is a flowchart illustrating the example of the operation of the visiting and leaving management device 700.

First, the communication unit 720 receives the information about the card ID and the terminal ID from the sensor terminal 800 which the IC card approaches (S701).

Subsequently, the control unit 730 determines whether or not the visiting of the area where the sensor terminal 800 which the IC card approaches is installed or the leaving from such area is permitted (S702). For example, the control unit 730 determines whether or not the visiting and leaving is permitted in a case where the area ID held in the sensor information holding table T21 in association with the received terminal ID is included in the permitted area ID held in the card information holding table T22 in association with the received card ID. In a case where the visiting and leaving is not permitted, the control unit 730 determines the authentication error (S707), and the process in FIG. 8 ends.

In a case where the visiting and leaving is permitted, the communication unit 720 transmits, for example, an instruction to the sensor terminal to which the IC card approaches, to unlock the door provided at the predetermined area (S703).

Subsequently, the control unit 730 determines whether or not the visitor information which includes the received card ID and the area ID held in the sensor information holding table T21 in association with the received terminal ID are included in the visitor information holding table T23 (S704).

In a case where the visitor information is not included in the visitor information holding table T23, the control unit 730 adds the visitor information to the visitor information holding table T23, and the visiting process ends (S705).

On the other hand, in a case where the visitor information is included in the visitor information holding table T23, the control unit 730 removes the visitor information from the visitor information holding table T23, and the leaving process ends (S706).

Here, a case where the visitor information about the visitor already entered is removed as a leaving person is illustrated. Alternatively, the visiting and leaving may be determined by the terminal ID. For example, in a case where the IC card approaches the sensor terminal 800 installed in the area other than the predetermined area, the visiting and leaving management device 700 or the sensor terminal 800 may determine that the bearer of the IC card is visiting. In addition, in a case where the IC card approaches the sensor terminal 800 installed in the area within the predetermined area, the visiting and leaving management device 700 or the sensor terminal 800 may determine that the bearer of the IC card is leaving.

In this way, according to the visiting and leaving management system 2000, it is possible to grasp presence or absence of the visitor in the predetermined area. The visiting and leaving management system 2000 may provide the monitoring system 1000 with the information about the visitor in the predetermined area (for example, the information about the presence or the absence of the visitor at least a part of information included in the visitor information holding table T23) via the network. The control device 100 of the monitoring system 1000 acquires, for example, the information about the visitor from the visiting and leaving management system 2000, and may open and close the shutter 300 according to the presence or the absence of the visitor.

Next, the time table T12 held in the storage unit 150 of the control device 100 in the monitoring system 1000 will be described.

Figure 9:
FIG. 9 is a schematic diagram illustrating an example of a time table that includes information about the opening and closing of the shutter, an implementation state of the image recording, and an implementation state of sound recording in each time zone in the embodiment.

FIG. 9 is a schematic diagram illustrating an example of the time table T12. The time table T12 includes, for example, information about the opening and closing state of the shutter 300, the implementation state of the image recording, and the implementation state of sound recording in each time zone. The time table T12 is stored in the storage unit 150.

In FIG. 9, on holidays, the monitoring system 1000 sets the operation mode as a monitoring mode for the entire day (0:00 to 24:00), implements the sound recording, implements the image recording, and causes the shutter 300 to be in the open state. For example, in a case of monitoring an office, since it is estimated that employees may not exist in the office on holiday, priority to the security can be given in such a time zone.

In addition, as illustrated in FIG. 9, from 08:30 to 17:00 on weekdays, the monitoring system 1000 sets the operation mode as a non-monitoring mode, does not implement the sound recording, does not implement the image recording, and causes the shutter 300 to be in the closed state. For example, in a case of monitoring the office, since it is assumed that employees may exist in the office during work hours, priority to the privacy can be given in such a time zone.

In addition, as illustrated in FIG. 9, in 00:00 to 08:30 and 17:00 to 24:00 on weekdays, the monitoring system 1000 sets the operation mode as the monitoring mode, implements the sound recording, implements the image recording, and causes the shutter 300 to be in the open state. For example, in a case of monitoring an office, since it is estimated that a few employees may exist in the office during work-off hours, priority to the security can be given in that time zone.

Next, the example of operation of the control device 100 in a case where the shutter 300 is open and closed according to the time schedule in the time table T12 will be described. Here, two examples of operation are illustrated. A first example of operation illustrates an example of operation when the shutter 300 is open and closed under the consideration of the schedule. A second example of operation illustrates an example of operation when the shutter 300 is open and closed under the consideration of threat level as an example of an event.

Figure 10:
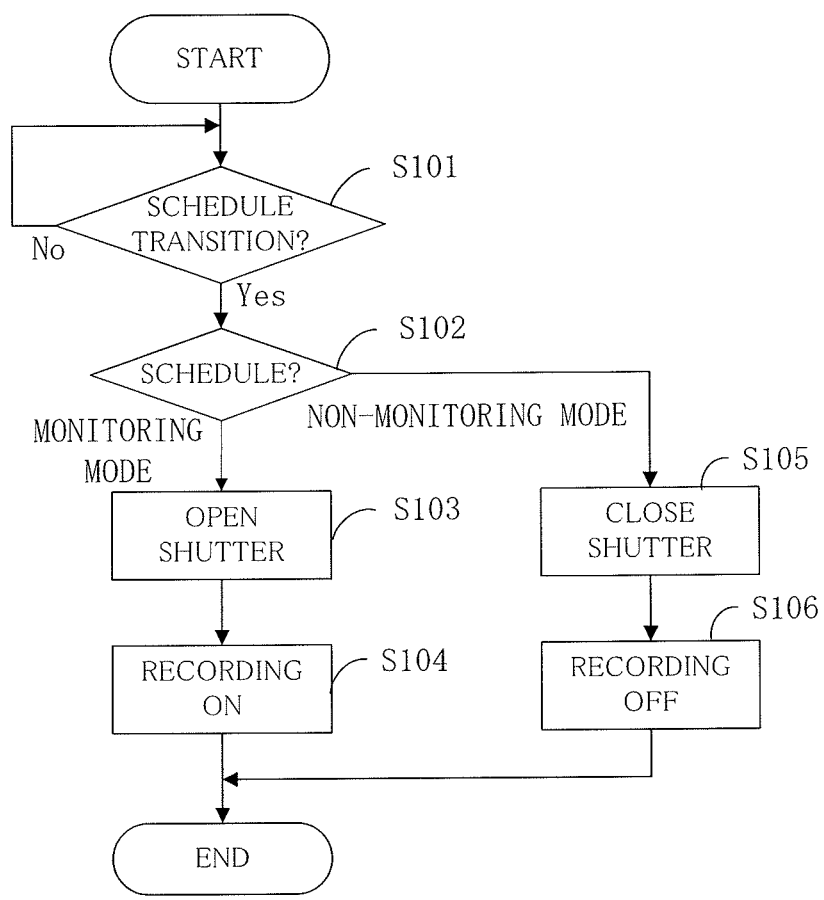
FIG. 10 is a flowchart illustrating a first example of operation of the control device in a case where the shutter is open and closed in the embodiment.

FIG. 10 is a flowchart illustrating an example of the first operation of the control device 100 in a case where the shutter 300 is open and closed.

First, the timer control unit 144 acquires information about the current time. The shutter control unit 141 determines whether or not the current time indicates a time of schedule transition with reference to the time table T12 (S101). In a case where the current time does not indicate the time of schedule transition, the step S101 is performed again.

In a case where the current time indicates the time of schedule transition, the shutter control unit 141 determines, with reference to the time table T12, whether the current time is in the time zone for monitoring mode or in the time zone for non-monitoring mode (S102). The time zone in S102 is the time zone after the schedule transition.

In a case where the current time is in the time zone for monitoring mode, the shutter control unit 141 transmits an instruction signal so as to open the shutter 300 via the communication unit 110 (S103). In addition, the image and sound control unit 142, transmits an instruction signal via the communication unit 110 so as to start collecting the sound by the microphone 240 of the camera device 200 and to start image capturing by the image capturing element 210 (S104).

In a case where the current time is in the time zone for non-monitoring mode, the shutter control unit 141 transmits an instruction signal with respect to the camera device 200 via the communication unit 110 so as to close the shutter 300 (S105). In addition, the image and sound control unit 142 transmits an instruction signal via the communication unit 110 so as to stop collecting the sound by the microphone 240 of the camera device 200 and to stop image capturing by the image capturing element 210 (S106).

According to the first example of operation of the control device 100, the monitoring system 1000 can operate according to the operation modes (monitoring mode and non-monitoring mode) which change depending on the schedule. In a case of the monitoring mode, the priority can be given to the securing of the security. In a case of the non-monitoring mode, the priority can be given to the protection of the privacy.

In FIG. 9 and FIG. 10, a case is illustrated where the image capturing and the sound collecting by the camera device 200 are implemented at the same time. Alternatively, the image capturing and the sound collecting may be implemented at different times. That is, in the monitoring mode, only the sound collecting may be implemented without capturing the image, or only the image capturing may be implemented without collecting the sound.

Next, the example of operation of the control device 100 in a case where the shutter 300 is open and closed depending on the threat level will be described.

Figure 11:
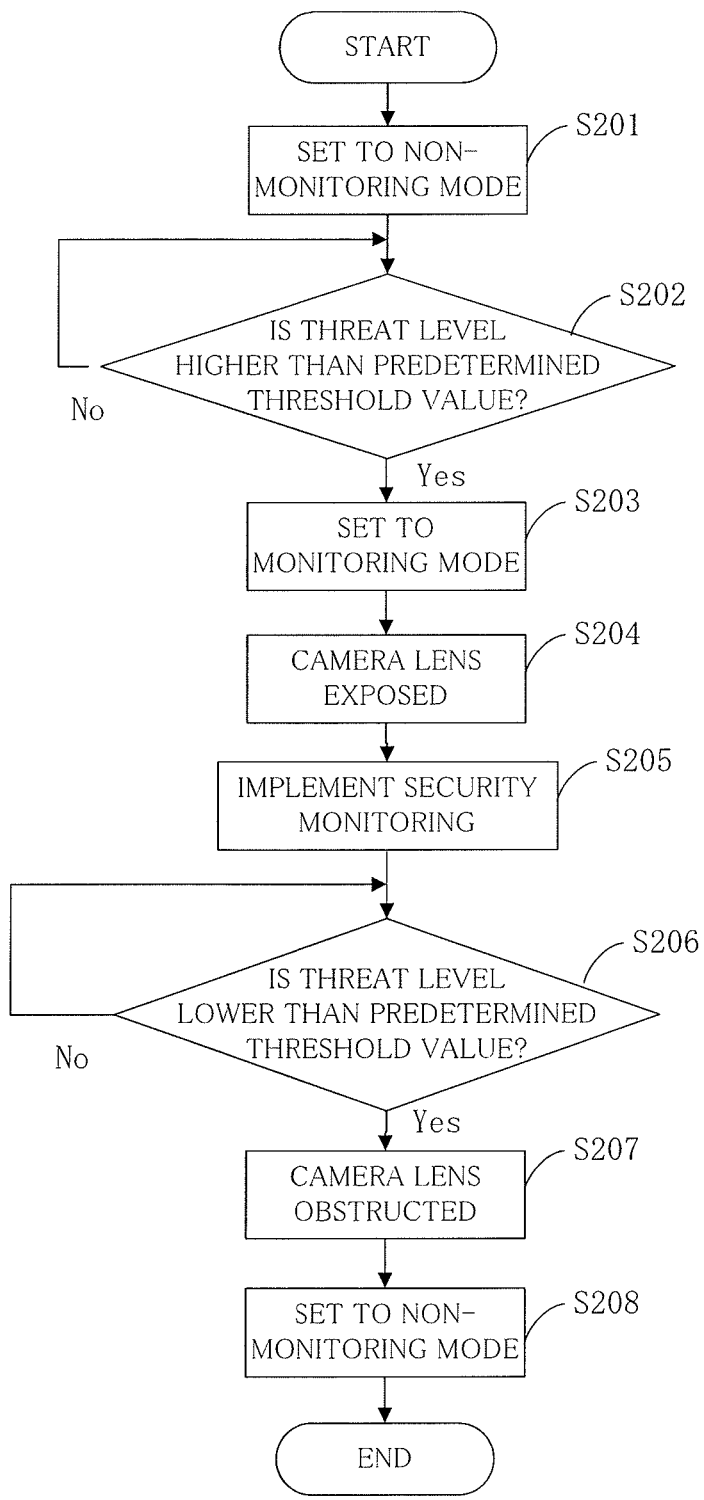
FIG. 11 is a flowchart illustrating a second example of the operation of the control device in a case where the shutter is open and closed in the embodiment.

FIG. 11 is a flowchart illustrating a second example of operation of the control device 100 in a case where the shutter 300 is open and closed. Moreover, in the second example of operation, a case where the threat level is high is an example of a case where an opening event occurs. In addition, a case where the threat level is low is an example of a case where the opening event does not occur or a closing event occurs.

In the second example of operation, the control unit 140 basically sets the operation mode of the monitoring system 1000 to the non-monitoring mode (S201). In the non-monitoring mode, the camera lens 260 is physically obstructed from the privacy-sensing area.

In a case where there is a threat at a high level, needs for safety and security take a higher priority than the need for the privacy. The threat at a high level includes, for example, a situation of a hostage or a fired shot. When the threat level exceeds a predetermined threshold value (S202), the control unit 140 transitions the operation mode to the monitoring mode (S203).

The case where the threat level exceeds a predetermined privacy threshold value, for example, includes a case where the emergency button 520 is pressed, a case where the effect that the emergency state is reported from the mobile terminal 530, and a case where a predetermined dangerous state is detected by the sensor 510.

In the monitoring mode, the shutter control unit 141 controls in such a manner that the shutter 300 is open, which enables the camera lens 260 be obstructed, and the shutter 300 moves to the position where the camera lens 260 is exposed (S204). In this way, the camera device 200 can monitor the privacy-sensing area and it is possible to secure the security with respect to the privacy-sensing area where the camera device 200 is disposed (S205).

After the step S205, after passing a predetermined time, for example, when a closing event occurs and the threat level is lower than the predetermined privacy threshold value (S206), the need for the privacy takes a higher priority than needs for the safety and the security. In this case, the shutter control unit 141 controls in such a manner that the shutter 300 is closed, and the shutter 300 returns to the position where the camera lens 260 is obstructed (S207). In addition, the control unit 140 transits the operation mode to the non-monitoring mode (S208).

The case where the threat level is lower than the predetermined threshold value, for example, includes a case where the pressing of the emergency button 520 is stopped, a case where an effect that the emergency state is terminated is notified from the mobile terminal 530, a case where the predetermined dangerous state is not detected by the sensor 510, and a case where a predetermined time has passed since the threat level exceeded the predetermined privacy level threshold value.

According to the second example of operation of the control device 100, in a case where the threat level is comparatively high, it is possible to strengthen the security. In addition, in a case where the threat level is comparatively low, for example, by using the state that the camera device 200 is obstructed from the outside, it is possible to realize the state in which a person in the privacy-sensing area does not feel the discomfort of being monitored.

Next, a specific example of cooperation between the control device 100 and at least one of the visiting and leaving management system 2000 and the sensor 510 will be described.

Figure 12A:
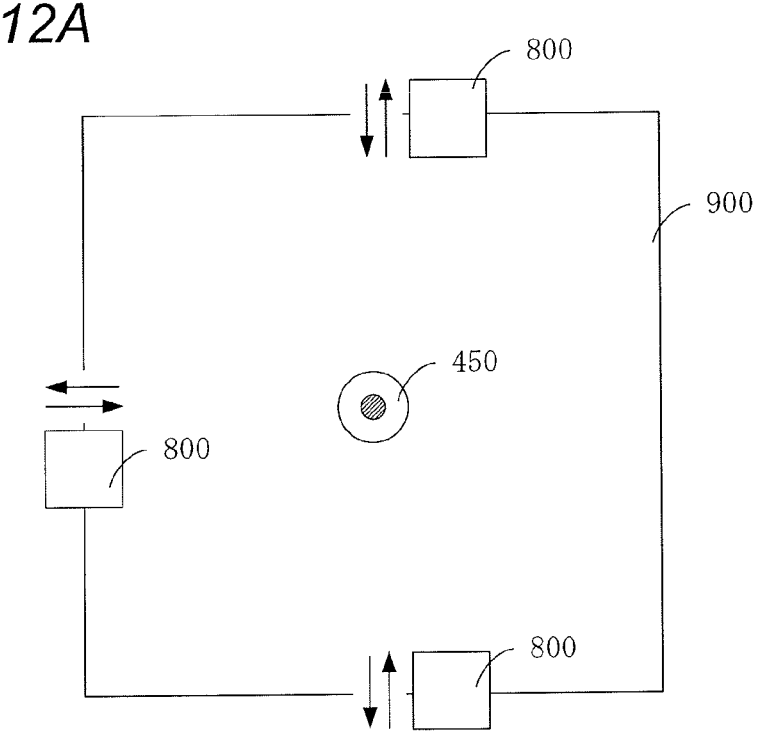
FIG. 12A is a schematic diagram illustrating an example of a state in a privacy-sensing area in a case where the control device and the visiting and leaving management system cooperate with each other according to the embodiment.
Figure 12B:
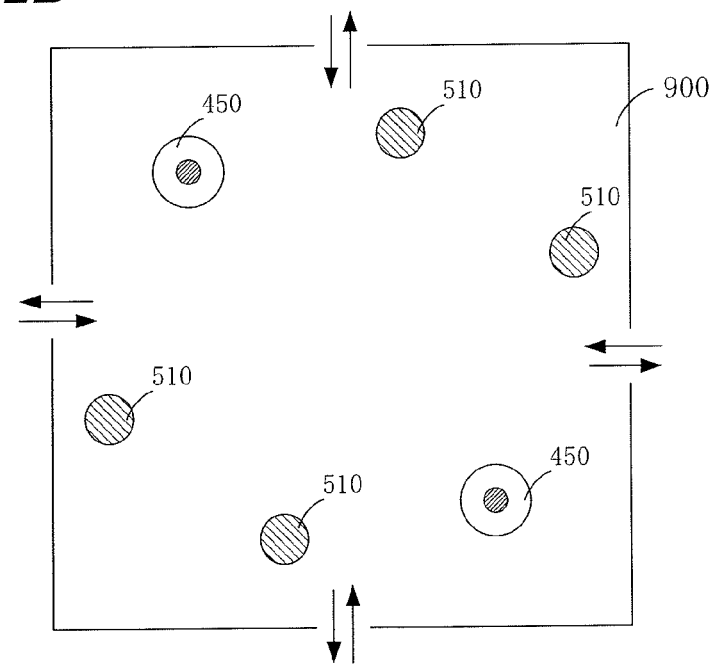
FIG. 12B is a schematic diagram illustrating an example of a state in the privacy-sensing area in a case where the control device and the sensors cooperate with each other according to the embodiment.

FIG. 12A is a schematic diagram illustrating an example of a state in a privacy-sensing area 900 in a case where the control device 100 and the visiting and leaving management system 2000 cooperate with each other. FIG. 12B is a schematic diagram illustrating an example of a state in the privacy-sensing area 900 in a case where the control device 100 and the sensors 510 cooperate with each other.

In FIG. 12A, a sensor terminal 800 of the visiting and leaving management system 2000 is installed in the vicinity of the door, and the camera device 200 that is capable of capturing an image the inside of the privacy-sensing area 900 is installed. For example, in the sensor terminal 800, the IC card held by the visitor or the leaving person in the privacy-sensing area 900 is submitted, and the sensor terminal 800 reads out the information of the visitor or the leaving person from the IC card, and the visit processing or the leave processing is performed by the visiting and leaving management device 700. For example, information of the visit processing, information of the leave processing, or information of the result of those processing types is transmitted to the control device 100 from the visiting and leaving management device 700. The control device 100 recognizes whether persons exist in the privacy-sensing area 900 or not, and the number of persons existing in the privacy-sensing area 900 according to the information from the visiting and leaving management device 700.

In FIG. 12B, sensors 510 that are capable of detecting a variety of events (for example, the existence of person) in the privacy-sensing area 900 and the camera devices 200 that are capable of capturing an image inside the privacy-sensing area 900 are installed. For example, according to the detection by each sensor 510, at least one of the camera devices 200 operates, and the shutter 300 which corresponds to the camera device 200 in operation is opened or closed. In addition, as illustrated in FIG. 5 and FIG. 6, the PTZ operation may be performed according to the sensor 510 which detects the event.

The sensor 510 (for example, a human sensor) detects, for example, a person existing in the privacy-sensing area 900 and notifies the control device 100 of the detected information. The control device 100 recognizes that the person exists in the privacy-sensing area 900 and the number of persons that exist in the privacy-sensing area 900 according to the detected information by the sensor 510. The sensor 510 may be other than a human sensor, and the control device 100 may analyze the detected information detected by the sensor 510 and determine the existence or non-existence of a person.

Moreover, arrows in three positions in FIG. 12A and FIG. 12B indicate visiting directions or leaving directions in the doors for visiting or leaving the privacy-sensing area 900. The number of the camera devices 200 or the sensor terminals 800 in the privacy-sensing area 900 is not limited to the number illustrated in FIG. 12A and FIG. 12B.

Figure 13A:
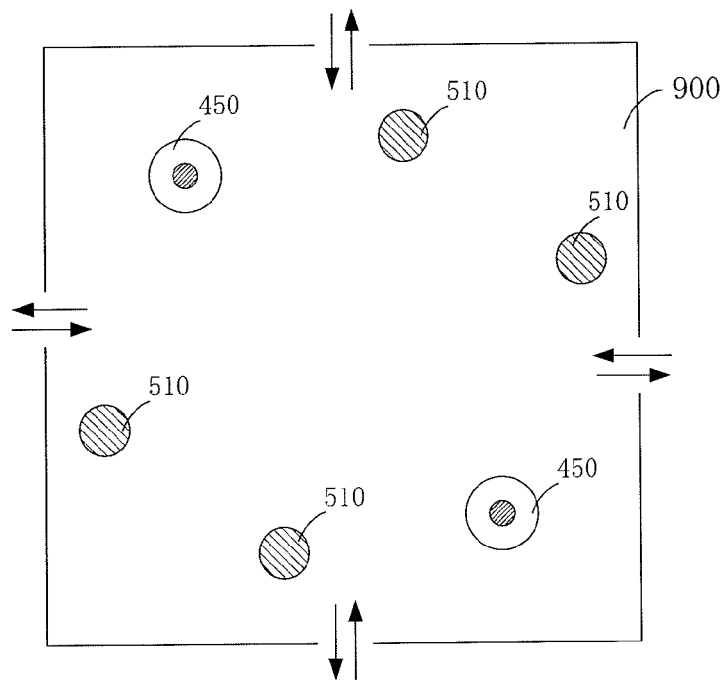
FIGS. 13A and 13B are schematic diagrams explaining the opening and closing control of the shutter in a case where the control device and the sensor cooperate with each other according to the embodiment.
Figure 13B:
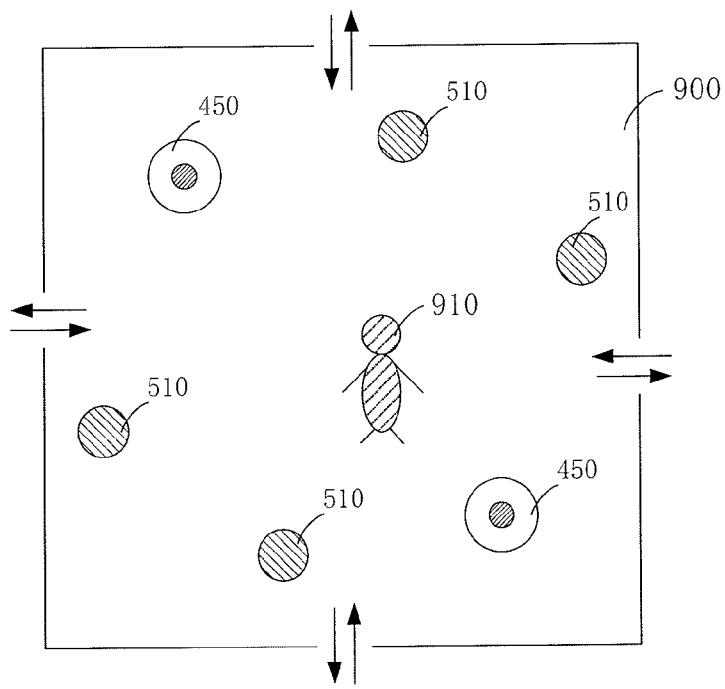

FIG. 13A and FIG. 13B are schematic diagrams explaining the opening and closing control of the shutter 300 in a case where the control device 100 and the sensor 510 cooperate. FIG. 13A is a schematic diagram illustrating a state in a case where a person does not exist in the privacy-sensing area 900. FIG. 13B is a schematic diagram illustrating a state in a case where a person 910 exists in the privacy-sensing area 900.

In FIG. 13A, no person exists in the privacy-sensing area 900. In this case, for example, the sensor 510 does not detect the existence of a person in the privacy-sensing area 900. In this case, in the control device 100, since the communication unit 110 does not receive the detected information, the shutter control unit 141 does not perform the control of the shutter 300. Therefore, in a case where the shutter 300 is in an open state, the state continues to be in the open state. In this way, it is possible to image and monitor the privacy-sensing area 900 and to ensure the security.

In FIG. 13B, a person 910 exists in the privacy-sensing area 900. In this case, for example, the sensor 510 detects the existence of the person 910 in the privacy-sensing area 900, and transmits the detected information to the control device 100. In the control device 100, the communication unit 110 receives the detected information and the existence determiner 146 determines that the person 910 exists in the privacy-sensing area 900, and the shutter control unit 141 controls the shutter 300 to be closed. In this way, it is possible to protect the privacy of the person 910 existing in the privacy-sensing area 900.

In this manner, the control device 100 may open or close the shutter 300 according to the existence or non-existence of the person 910 in the privacy-sensing area 900. Therefore, the security can be ensured in a case where the person 910 does not exist and the privacy can be protected in a case where the person 910 exists.

Moreover, in the control device 100, in a case where the detected information is not received during a predetermined period from the sensor 510 by the communication unit 110, the existence determiner 146 determines that the person 910 existing in the privacy-sensing area 900 leaves and the shutter control unit 141 may control the shutter 300 to be opened. In addition, even in a case where the sensor 510 does not detect any particular event, the sensor 510 may periodically transmit the information indicating that the sensor 510 does not detect the event, to the control device 100.

Figure 14A:
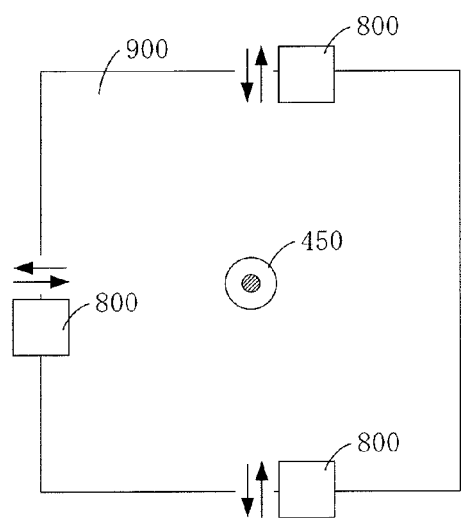
FIGS. 14A to 14D are schematic diagrams for explaining the opening and closing control of the shutter in a case where the control device and the visiting and leaving management system cooperate with each other according to the embodiment.
Figure 14B:
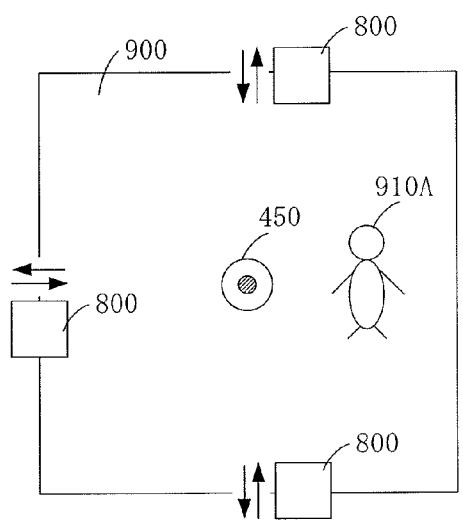
Figure 14C:
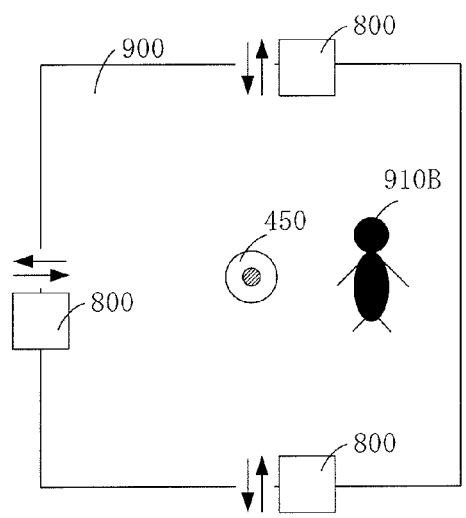
Figure 14D:
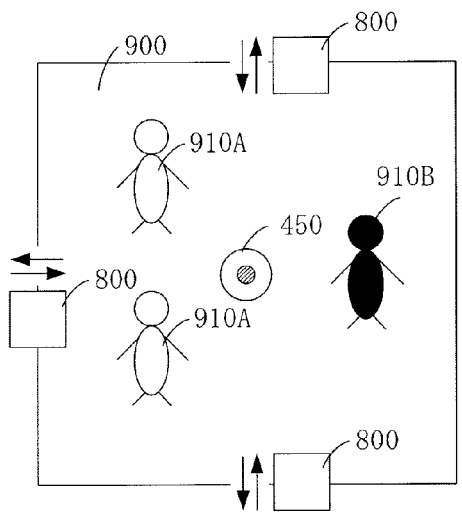

FIGS. 14A to 14D are schematic diagrams for explaining the opening and closing control of the shutter 300 in a case where the control device 100 and the visiting and leaving management system 2000 cooperate with each other. FIG. 14A is a schematic diagram illustrating a state in which a person does not exist in the privacy-sensing area 900. FIG. 14B is a schematic diagram illustrating a state in which a non-suspicious person 910A exists in the privacy-sensing area 900. FIG. 14C is a schematic diagram illustrating a state in which a suspicious person 910B exists in the privacy-sensing area 900. FIG. 14D is a schematic diagram illustrating a state in which both of non-suspicious persons 910A and a suspicious person 910B exist in the privacy-sensing area 900. The non-suspicious person 910A means a person, for example, who is approved as non-suspicious and pre-registered.

In FIG. 14A, any person (including a non-suspicious person 910A and a suspicious person 910B) does not exist in the privacy-sensing area 900. In this case, in a visitor information holding table T23 included in the visiting and leaving management device 700, information of the visitor is not held. For example, the visiting and leaving management device 700 transmits the information in the visitor information holding table T23 to the control device 100. In the control device 100, the communication unit 110 receives the information in the visitor information holding table T23, the existence determiner 146 determines that a person does not exist in the privacy-sensing area 900 with reference to the information in the visitor information holding table T23, and the shutter control unit 141 controls the shutter 300 to be opened.

In this way, the inside of the privacy-sensing area 900 can be captured and monitored, and then it is possible to ensure the security. Moreover, at least a part of information in the visitor information holding table T23 is an example of existence information indicating whether a person exists or not in the privacy-sensing area 900.

In FIG. 14B, a non-suspicious person 910A exists in the privacy-sensing area 900. The non-suspicious person 910A is a person who is regularly permitted to visit and leave the privacy-sensing area 900, and whose identification information of the IC card is registered in the card information holding table T22. For example, an employee in an office is the non-suspicious person 910A. The non-suspicious person 910A is an example of the predetermined person.

In a case where a non-suspicious person 910A exists in the privacy-sensing area 900, in the visitor information holding table T23 included in the visiting and leaving management device 700, information of the visitor (non-suspicious person 910A) is held. The visiting and leaving management device 700 transmits the information in the visitor information holding table T23. In the control device 100, the communication unit 110 receives the information in the visitor information holding table T23, the existence determiner 146 determines that a non-suspicious person 910A exists in the privacy-sensing area 900 with reference to the information in the visitor information holding table T23, and the shutter control unit 141 controls the shutter 300 to be closed. In this way, it is possible to protect the privacy of the non-suspicious person 910A existing in the privacy-sensing area 900.

In FIG. 14C, a suspicious person 910B exists in the privacy-sensing area 900. The suspicious person 910B is a person who is not regularly permitted to visit and leave the privacy-sensing area 900. For example, the suspicious person 910B is a person who does not hold the IC card, or whose identification information of the IC card is not registered in the card information holding table T22. In addition, in a case where a person visits the privacy-sensing area 900 without passing the IC card over the sensor terminal 800, thus, the visit processing is not normally performed, such a person is included as the suspicious person 910B. In addition, for example, in a case where an IC card is lent to a person and the predetermined ID is not given to the IC card, the person whose information is not individually held in the visitor information holding table T23 as a non-suspicious person 910A, such a person is included as the suspicious person 910B. The suspicious person 910B is an example of a person other than the predetermined person.

For example, in a case where a suspicious person 910B visits the privacy-sensing area 900, the visiting and leaving management device 700 detects the authentication error by the authentication processing and notifies the control device 100 of the information on the authentication error. In the control device 100, the communication unit 110 receives the information on the authentication error, the existence determiner 146 estimates that the suspicious person 910B exists in the privacy-sensing area 900, and the shutter control unit 141 controls the shutter 300 to be opened. In this way, even though a suspicious person 910B visits the privacy-sensing area 900, the suspicious person 910B existing in the privacy-sensing area 900 can be imaged or captured, and thus, it is possible to ensure the security.

In FIG. 14D, both of non-suspicious persons 910A and a suspicious person 910B exist in the privacy-sensing area 900. In this case, the visiting and leaving management device 700 detects the authentication error (for example, refer to S707 in FIG. 8) regarding the suspicious person 910B by the authentication processing, and notifies the control device 100 of the information on the authentication error. In the control device 100, the communication unit 110 receives the information on the authentication error, the existence determiner 146 estimates that a suspicious person 910B exists in the privacy-sensing area 900, and the shutter control unit 141 controls the shutter 300 to be opened. In this way, the suspicious person 910B existing in the privacy-sensing area 900 can be imaged or captured, and thus, it is possible to ensure the security.

Moreover, in FIG. 14D, since a non-suspicious person 910A is also included in the privacy-sensing area 900, the information in the visitor information holding table T23 may be transmitted to the control device 100. However, in that case also, the shutter control unit 141 gives a priority to the information on the authentication error rather than to the information in the visitor information holding table T23, and controls the shutter 300 to be opened.

Like this, the control device 100 may open and close the shutter 300 according to the existence or non-existence of the predetermined person (for example, a non-suspicious person 910A) in the privacy-sensing area 900. Therefore, for example, the security can be ensured in a case where a non-suspicious person 910A does not exist, and the privacy can be protected in a case where a non-suspicious person 910A exists.

In addition, the control device 100 may open and close the shutter 300 according to the existence or non-existence of a person other than the predetermined person (for example, a suspicious person 910B) in the privacy-sensing area 900. Therefore, for example, the security can be ensured in a case where the suspicious person 910B exists.

Figure 15:
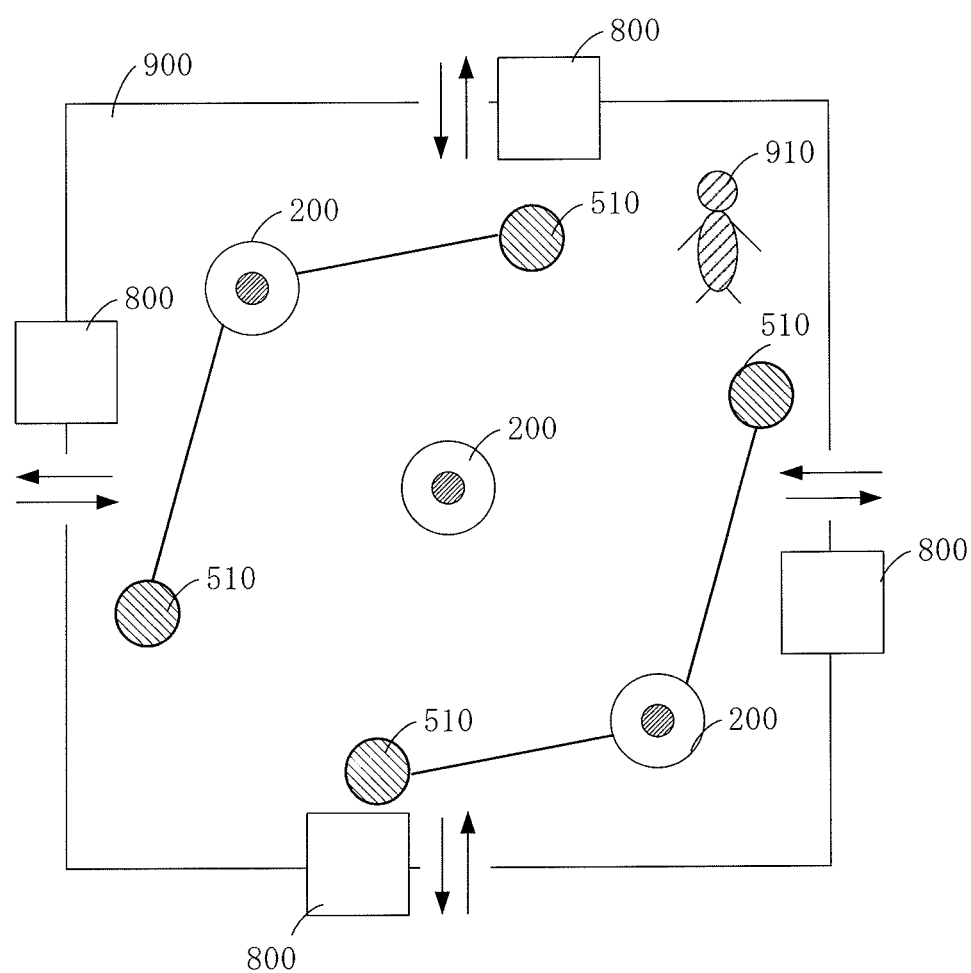
FIG. 15 is a schematic diagram for explaining the opening and closing control of the shutter in a case where the control device, the visiting and leaving management system, and the sensor cooperate with each other according to the embodiment.

FIG. 15 is a schematic diagram for explaining the opening and closing control of the shutter 300 in a case where the control device 100, the visiting and leaving management system 2000, and the sensor 510 cooperate with each other.

In FIG. 15, a certain number of persons 910 exists in the privacy-sensing area 900. For example, in the visitor information holding table T23 included in the visiting and leaving management device 700, there is a possibility that the information on the visitor (including the non-suspicious person 910A) is held. The visiting and leaving management device 700 receives the information in the visitor information holding table T23 and the control device 100 receives the information in the visitor information holding table T23. For example, in a case where the information for three persons are included in the visitor information holding table T23, the control device 100 determines that the number of visitors is three.

On the other hand, if it is assumed that four persons are detected by the sensor 510 in the privacy-sensing area 900, in this case, each sensor 510 may have a different detection area from each other, and one person may be detected in each detection area. In addition, the sensor 510 may detect a plurality of persons in a specific detection area by an analysis or the like.

For example, in a case where the number of persons detected by the visiting and leaving management device 700 (for example, zero) and the number of persons detected by the sensor 510 (for example, one) is different, or in a case where a person is detected by the sensor terminal 800 of the visiting and leaving management system 2000 but is not detected by the sensor 510 of the monitoring system 1000, there is a high possibility that a suspicious person is included in addition to a non-suspicious person. In this case, the shutter control unit 141 controls the shutter 300 to be opened. In this way, it is possible to strengthen the monitoring of the person 910 existing in the privacy-sensing area 900, and to ensure the security.

Figure 16:
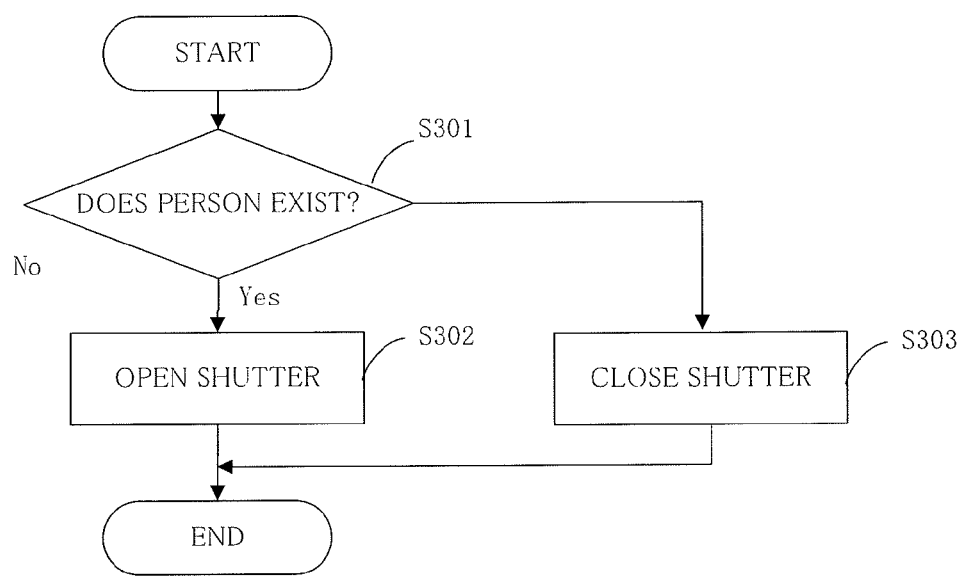
FIG. 16 is a flow chart illustrating a third operation example of the control device in a case where the shutter is opened and closed according to the embodiment.

FIG. 16 is a flow chart illustrating a third operation example of the control device 100 in a case where the shutter 300 is opened and closed. In the third operation example, the shutter 300 is opened and closed according to whether or not a person exists in the privacy-sensing area 900, or whether or not it is expected that a person exists.

First, the existence determiner 146 determines whether or not a person exists in the privacy-sensing area 900 (S301). The determination of whether a person exists or not is performed by the method described using any of FIGS. 13A and 13B, FIGS. 14A to 14D, and FIG. 15. For example, the control device 100 may cooperate with at least one of the visiting and leaving management system 2000 and the sensors 510, and the existence determiner 146 may check the existence or non-existence of a person in the privacy-sensing area 900 or the number of existing persons, if any.

In a case where a person 910 or a non-suspicious person 910A is determined to be existing in the privacy-sensing area 900, or in a case where a suspicious person 910B is determined not to be existing, the shutter control unit 141 controls the shutter 300 to be closed (S302).

In this way, the privacy of the person 910 or the non-suspicious person 910A existing in the privacy-sensing area 900 can be protected. For example, in a case where a person who is not a suspicious person (for example, an employee of the office) exists in the privacy-sensing area 900, the privacy of the person can be protected without causing a feeling of discomfort due to being imaged or captured.

In a case where a person 910 or a non-suspicious person 910A is determined not to be existing in the privacy-sensing area 900, or in a case where a suspicious person 910B is determined to be existing, the shutter control unit 141 controls the shutter 300 to be opened (S303).

In this way, the security in the privacy-sensing area 900 where the person 910 or the non-suspicious person 910A does not exist can be ensured. For example, in a case where a person who is not a suspicious person (for example, an employee of the office) does not exist in the privacy-sensing area 900, the entry of a suspicious person can be monitored, and thus, the security can be ensured.

Moreover, for example, the existence determiner 146 may estimate existence or non-existence of a person 910 in the privacy-sensing area 900 according to the time zone. For example, the timer control unit 144 counts the current time, and then, the existence determiner 146 may detect the existence or non-existence of a person in the privacy-sensing area 900 based on the current time. For example, the existence determiner 146 refers to a time table T13 illustrated in FIG. 17.

For example, in the time zone of night time of weekdays (00:00 to 08:30 and 17:00 to 24:00) and holidays (00:00 to 24:00) in which the employees of the company are not expected to be existing, the existence determiner 146 may estimate that a person 910 does not exist in the privacy-sensing area 900.

In addition, for example, in the time zone of day times of weekdays (08:30 to 17:00) which is expected to be a work time in the company, the existence determiner 146 may estimate that a person 910 exists in the privacy-sensing area 900.

In addition, in a case where a suspicious person 910B is determined to be existing in the privacy-sensing area 900, in addition to the shutter control, the PTZ control unit 143 may perform the PTZ control in such a manner that a predetermined area including the suspicious person 910B is included in the image-capturing area according to necessity. In this way, even in a case where the camera device 200 is not an omni-directional camera, it is possible to monitor the suspicious person well.

In addition, the existence determiner 146 may control the opening and closing of the shutter 300 according to whether or not it is expected that the non-suspicious person 910A exists, not according to whether or not the non-suspicious person 910A is actually existing. For example, the existence determiner 146 may estimate whether or not the non-suspicious person exists in the privacy-sensing area at the current time with reference to the history of the non-suspicious person's visiting and leaving time in the past. Information on the history of the non-suspicious person's visiting and leaving time in the past may be stored in the storage unit 150.

Figure 17:
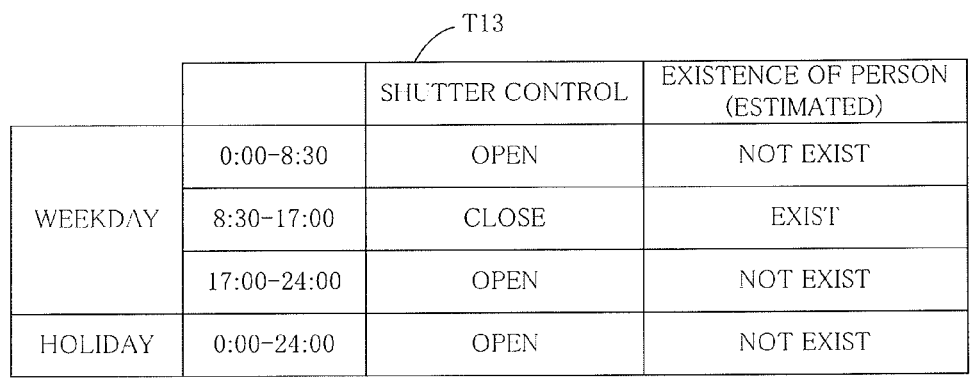
FIG. 17 is a schematic diagram illustrating an example of a time table including information of open and closed state of the shutter in each time zone and estimated information of existence of a person according to the embodiment.

In FIG. 17, it is assumed that the opening and closing control of the shutter 300 is performed by estimating the existence or non-existence of a person without considering the actual existence or non-existence. However, the actual existence or non-existence may be considered. In this case, the existence determiner 146, for example, may refer to a time table T14 illustrated in FIG. 18, not the time table T13 illustrated in FIG. 17. In FIG. 18, it is assumed that the shutter 300 is basically in the closed state in a case where a person 910 does not exist in the privacy-sensing area 900.

For example, in the night time zone on weekdays (00:00 to 08:30, 17:00 to 24:00) and in the holidays (00:00 to 24:00), it is expected that the employees do not exist in the company. In this time zone, the existence determiner 146 estimates that a person 910 does not exist in the privacy-sensing area 900. In a case where a person actually exists in the privacy-sensing area 900, since the possibility of a suspicious person being existing is high, the shutter control unit 141 controls the shutter 300 to be opened. In this way, it is possible to ensure the security.

In addition, for example, in the time zone of day time on weekdays (08:30 to 17:00), it is expected that it is the work time in the company. In this time zone, the existence determiner 146 estimates that a person 910 exists in the privacy-sensing area 900. In a case where a person actually exists in the privacy-sensing area 900, since the possibility of a non-suspicious person (for example, an employee of the company) being existing is high, the shutter control unit 141 does not particularly operate, and the shutter 300 keeps the closed state. In this way, it is possible to protect the privacy.

In this way, according to the monitoring system 1000, in a case where a person 910 or a non-suspicious person 910A does not exist in the privacy-sensing area 900, or in a case where a suspicious person 910B exists, it is possible to strengthen the security in the privacy-sensing area 900. In addition, in a case where a person 910 or a non-suspicious person 910A exists in the privacy-sensing area 900 or in a case where a suspicious person 910B does not exist, it is possible to strengthen the privacy protection in the privacy-sensing area 900.

In the camera system in the related art, it could not be sufficiently considered whether or not a person has been existed in the predetermined area which was imaged by the camera device 200. In the monitoring system 1000, since more consideration is given to the existence of the person in the predetermined area than that in the camera system in the related art, it is possible to more appropriately have a balance in the privacy protection and ensuring security.

Moreover, the present invention is not limited to the embodiment described above. The present invention can be applied to any of configurations, as long as the functions identified in Claims attached hereto or the functions which are included in the configuration in the embodiment can be achieved by the configurations.

For example, in the embodiment described above, the control of the shutter 300 to be opened or closed may be performed according to the existence of a specific person among the non-suspicious persons. For example, the operation unit 160 may specify or set a specific employee (a person to be monitored) among the employees and the like. The person to be monitored is, for example, the person specified among the non-suspicious person by the operation unit 160. For specifying a person by the operation unit 160, for example, identification information of the IC card is specified. The persons to be monitored are a part or all of the persons whose IC card information is registered in the card information holding table T22.

In the control device 100, for example, the identification information of the IC card held by the person subject to be monitored is input by the operation unit 160, and the control unit 140 registers the identification information to the storage unit 150. In a case where the information of the visitor information holding table T23 is received by the communication unit 110 from the visiting and leaving management device 700, the existence determiner 146 determines whether or not the identification information of the IC card registered in the storage unit 150 is included in the information of the visitor information holding table T23. Like this, the fact that the identification information of the IC card is included is an example of a fact that the information in which the person subject to be monitored exists in the predetermined area is included.

In a case where the identification information of the IC card is included in the information of the visitor information holding table T23, the existence determiner 146 determines that the person subject to be monitored exists in the privacy-sensing area 900, and the shutter control unit 141 controls the shutter 300 to be closed. In this way, it is possible to protect the privacy of the person subject to be monitored.

On the other hand, in a case where the identification information of the IC card is not included in the information of the visitor information holding table T23, the existence determiner 146 determines that the person subject to be monitored does not exist in the privacy-sensing area 900, and the shutter control unit 141 controls the shutter 300 to be opened. In this way, it is possible to ensure the security in the privacy-sensing area 900.

In addition, in the embodiment described above, collecting and recording of the sound by the microphone in the camera device 200 may be omitted.

In addition, in the embodiment described above, it is assumed that the closing event or the closing schedule of the shutter 300 (non-monitoring mode) exists, and the duration of the opening event or the duration of opening the shutter 300 may be set in advance. In this case, the shutter 300 may be in the closed state after the predetermined duration from the starting of the opening event or starting of the monitoring mode by the schedule.

In addition, in the embodiment described above, a case is illustrated where the various instruction signals are transmitted from the control device 100 with respect to the camera device 200, and the camera device 200 operates based on such instruction signals. Even in a case other than those cases, the camera device 200 may detect various events, and may operate independently.

Some aspects of the present invention will be described below.

A first aspect of the present invention provides a monitoring apparatus to be connected to a shutter which opens and closes to limit a capturing area of an image capturing device, the monitoring apparatus including: an information obtaining section, configured to obtain information; an existence determiner, configured to determine whether a person exists or not in a predetermined area in accordance with the information obtained by the information obtaining section; and a shutter control unit, configured to control the shutter to be opened in response that the existence determiner determines that the person does not exist in the predetermined area.

According to the configuration as mentioned above, if a person does not exist in a predetermined area, it is possible to enhance the security of the predetermined area.

The monitoring apparatus may be configured so that the shutter control unit controls the shutter to be closed in response that the existence determiner determines that the person exists in the predetermined area.

According to the configuration as mentioned above, if a person does not exist in a predetermined area, it is possible to enhance the security of the predetermined area.

The monitoring apparatus may be configured so that the information includes existence information which indicates whether the person exist or not in the predetermined area, and the existence determiner determines whether the person exist or not in the predetermined area in accordance with the existence information.

According to the configuration as mentioned above, it is possible to enhance the security of the predetermined area, for example, by using the information indicating whether the person actually exists in the predetermined area or not.

The monitoring apparatus may be configured so that the information obtaining section obtains information which indicates a current time, and the existence determiner determines that the person does not exist in the predetermined area when the current time obtained by the information obtaining section is contained in a given time zone.

According to the configuration as mentioned above, it is possible to enhance the security by assuming that a person does not exist if the current time is within a time zone in which a person unlikely exists in the predetermined area.

The monitoring apparatus may be configured so that the existence determiner determines whether a registrant who is previously registered exists in the predetermined area, and the shutter control unit controls the shutter to be opened in response that the existence determiner determines that the registrant does not exist in the predetermined area.

According to the configuration as mentioned above, it is possible to enhance the security, for example, if there is no person such as employee who is permitted to be existing in the predetermined area.

The monitoring apparatus may be configured so that the existence determiner determines whether a registrant who is previously registered exists in the predetermined area, and the shutter control unit controls the shutter to be closed in response that the existence determiner determines that the registrant exists in the predetermined area.

According to the configuration as mentioned above, it is possible to enhance the privacy protection, for example, if there is no person such as employee who is permitted to be existing in the predetermined area.

The monitoring apparatus may be configured so that the existence determiner determines whether a person other than a registrant who is previously registered exists in the predetermined area, and the shutter control unit controls the shutter to be opened in response that the existence determiner determines that the person other than the registrant exists in the predetermined area.

According to the configuration as mentioned above, it is possible to enhance the security, for example, if there is a suspicious person other than a person such as employee who is permitted to be existing in the predetermined area.

The monitoring apparatus may be configured so that the information obtaining section obtains the information from a visiting and leaving management system which manages visiting and leaving to and from the predetermined area.

According to the configuration as mentioned above, it is possible to enhance the security and the privacy protection in accordance with the existence of a person in cooperation with the visiting and leaving management system.

The monitoring apparatus may be configured by further including a registration unit, configured to register information of a monitoring target, wherein the existence determiner determines that the monitoring target does not exist in the predetermined area when the information from the visiting and leaving management system does not contain information which indicates that the monitoring target registered by the registration unit exists in the predetermined area.

According to the configuration as mentioned above, it is possible to enhance the security when a particular monitoring target does not exist in the privacy-sensing area. In addition, the monitoring accuracy is raised by arbitrarily setting a particular monitoring target among persons who are permitted to visit or leave in the predetermined area by the visiting and leaving management system.

The monitoring apparatus may be configured so that the information obtaining section obtains first information from a visiting and leaving management system which manages visiting and leaving to and from the predetermined area and obtains second information from a sensor device which senses whether a person exists or not in the predetermined area, and the shutter control unit controls the shutter to be opened in response that a number of existence in the predetermined area calculated from the first information is different from a number of existence in the predetermined area calculated from the second information.

According to the configuration as mentioned above, it is possible to estimate the existence of a suspicious person, for example, when the visiting process is not regularly performed in visiting or the leaving process is not regularly performed in leaving or even when an error occurs in the visiting and leaving management system or the sensing device. Thus, the security level is further improved.

Another aspect of the present invention provides a monitoring system including: an image capturing device; a shutter which opens and closes to limit a capturing area of the image capturing device; and a monitoring apparatus which is connected to the shutter and controls an operation of the shutter, wherein the monitoring apparatus includes: an information obtaining section, configured to obtain information; a controller, configured to determine whether a person exists or not in a predetermined area in accordance with the information obtained by the information obtaining section; and a communication section, configured to transmit an instruction signal to cause the shutter to be opened in response that the existence determiner determines that the person does not exist in the predetermined area, wherein the shutter becomes an open state based on the instruction signal.

According to the configuration as mentioned above, if a person does not exist in a predetermined area, it is possible to enhance the security of the predetermined area.

Still another aspect of the present invention provides a monitoring method in a monitoring apparatus to be connected to a shutter which opens and closes to limit a capturing area of an image capturing device, the monitoring method including: determining whether a person exists or not in a predetermined area in accordance with information from a source; and controlling the shutter to be opened in response that it is determined that the person does not exist in the predetermined area. The information may be obtained from an external source.

According to the configuration as mentioned above, if a person does not exist in a predetermined area, it is possible to enhance the security of the predetermined area.

The present invention may be useful for an apparatus or the like to improve the level of privacy protection and/or the security.

What is claimed is:

1. A monitoring apparatus to be connected to a shutter which opens and closes to limit a capturing area of an image capturing device, the monitoring apparatus comprising:
   a memory that stores instructions; and
   a processor that, when executing the instructions stored in the memory, performs operations comprising:
   obtaining information from a visiting and leaving management system that manages visiting and leaving of persons to and from a predetermined area, based on a detection of an integrated circuit card of each person;
   determining whether or not a person is present in the predetermined area in accordance with the information obtained from the visiting and leaving management system; and
   controlling the shutter to be opened when it is determined that no person is present in the predetermined area, wherein
   a sensor terminal is installed inside or outside of the predetermined area, and detects that the integrated circuit card of each person approaches the sensor terminal,
   a door is provided at the predetermined area, and
   the sensor terminal unlocks the door when the integrated circuit card of each person approaches the sensor terminal.

2. The monitoring apparatus according to claim 1, wherein the processor, when executing the instructions stored in the memory, further performs operations comprising:
   controlling the shutter to be closed when it is determined that a person is present in the predetermined area.

3. The monitoring apparatus according to claim 1, wherein
   the information includes presence information which indicates whether or not a person is present in the predetermined area, and
   it is determined whether or not a person is present in the predetermined area in accordance with the presence information.

4. The monitoring apparatus according to claim 1, wherein the processor, when executing the instructions stored in the memory, further performs operations comprising:
   obtaining information which indicates a current time, and
   determining that no person is present in the predetermined area when the obtained current time is in a given time zone.

5. The monitoring apparatus according to claim 1, wherein the processor, when executing the instructions stored in the memory, further performs operations comprising:
   determining whether a registrant, who is previously registered, is present in the predetermined area,
   controlling the shutter to be opened when it is determined that no registrant is present in the predetermined area.

6. The monitoring apparatus according to claim 1, wherein the processor, when executing the instructions stored in the memory, further performs operations comprising:
   determining whether a registrant, who is previously registered, is present in the predetermined area, and
   controlling the shutter to be closed when it is determined that a registrant is present in the predetermined area.

7. The monitoring apparatus according to claim 1, wherein the processor, when executing the instructions stored in the memory, further performs operations comprising:
   determining whether a person other than a registrant, who is previously registered, is present in the predetermined area, and
   controlling the shutter to be opened when it is determined that a person other than the registrant is present in the predetermined area.

8. The monitoring apparatus according to claim 1, wherein the processor, when executing the instructions stored in the memory, further performs operations comprising:
   registering information of a monitoring target, and
   determining that the monitoring target is not present in the predetermined area when the information from the visiting and leaving management system does not contain information indicating that the registered monitoring target is present in the predetermined area.

9. The monitoring apparatus according to claim 1, wherein the processor, when executing the instructions stored in the memory, further performs operations comprising:
   obtaining first information from the visiting and leaving management system,
   obtaining second information from a sensor device that senses whether or not a person is present in the predetermined area, and
   controlling the shutter to be opened when it is determined that a number of people in the predetermined area calculated from the first information is different from a number of people in the predetermined area calculated from the second information.

10. A monitoring system comprising:
    an image capturing device;
    a shutter which opens and closes to limit a capturing area of the image capturing device; and
    a monitoring apparatus which is connected to the shutter and controls an operation of the shutter, wherein
    the monitoring apparatus comprises:
    a memory that stores instructions; and
    a processor that, when executing the instructions stored in the memory, performs operations comprising:
    obtaining information from a visiting and leaving management system that manages visiting and leaving of persons to and from a predetermined area, based on a detection of an integrated circuit card of each person;
    determining whether or not a person is present in the predetermined area in accordance with the information obtained from the visiting and leaving management system; and
    transmitting an instruction signal to open the shutter when it is determined that no person is present in the predetermined area, wherein
    the shutter enters an open state based on the instruction signal,
    a sensor terminal is installed inside or outside of the predetermined area, and detects that the integrated circuit card of each person approaches the sensor terminal,
    a door is provided at the predetermined area, and
    the sensor terminal unlocks the door when the integrated circuit card of each person approaches the sensor terminal.

11. A monitoring method in a monitoring apparatus to be connected to a shutter which opens and closes to limit a capturing area of an image capturing device, the monitoring method comprising:
- determining whether or not a person is present in a predetermined area in accordance with information obtained from a visiting and leaving management system that manages visiting and leaving of persons to and from a predetermined area, based on a detection of an integrated circuit card of each person; and
- controlling the shutter to be opened when it is determined that no person is present in the predetermined area, wherein
- a sensor terminal is installed inside or outside of the predetermined area, and detects that the integrated circuit card of each person approaches the sensor terminal,
- a door is provided at the predetermined area, and
- the sensor terminal unlocks the door when the integrated circuit card of each person approaches the sensor terminal.

12. The monitoring method according to claim 11, wherein
- the information from the visiting and leaving management system is obtained from an external source.

* * * * *